US008662716B2

(12) United States Patent
Munro et al.

(10) Patent No.: US 8,662,716 B2
(45) Date of Patent: Mar. 4, 2014

(54) SIDE-EMITTING OPTICAL ELEMENTS AND METHODS THEREOF

(75) Inventors: James F. Munro, Walworth, NY (US); Penny J. Munro, Walworth, NY (US)

(73) Assignee: Orafol Americas Inc., Avon, CT (US)

( * ) Notice: Subject to any disclaimer, the term of this patent is extended or adjusted under 35 U.S.C. 154(b) by 517 days.

(21) Appl. No.: 12/313,243

(22) Filed: Nov. 18, 2008

(65) Prior Publication Data
US 2010/0124055 A1  May 20, 2010

(51) Int. Cl.
F21V 5/04 (2006.01)

(52) U.S. Cl.
USPC ............... 362/338; 362/317; 362/327

(58) Field of Classification Search
USPC ........... 362/97.1, 255, 305, 307–310, 311.01, 362/311.02, 317, 326–329, 332–340, 350, 362/364, 509, 555, 613, 623, 241, 245–247, 362/327, 328, 338, 343, 346; 257/79, 257/98–100, E33.059, E33.073; 359/707–708, 711, 712, 718, 719, 725, 359/726, 741
See application file for complete search history.

(56) References Cited

U.S. PATENT DOCUMENTS

| 5,757,557 | A * | 5/1998 | Medvedev et al. ............ 359/708 |
| 6,598,998 | B2 | 7/2003 | West et al. |
| 6,607,286 | B2 | 8/2003 | West et al. |
| 6,674,096 | B2 | 1/2004 | Sommers |
| 6,679,621 | B2 | 1/2004 | West et al. |
| 6,724,543 | B1 * | 4/2004 | Chinniah et al. ............ 359/718 |
| 6,945,672 | B2 | 9/2005 | Du et al. |
| 6,972,439 | B1 | 12/2005 | Kim et al. |
| 7,006,306 | B2 | 2/2006 | Falicoff et al. |
| 7,083,313 | B2 | 8/2006 | Smith |
| 7,118,262 | B2 | 10/2006 | Negley |
| 7,142,769 | B2 | 11/2006 | Hsieh et al. |
| 7,153,002 | B2 | 12/2006 | Kim et al. |
| 7,172,324 | B2 | 2/2007 | Wu et al. |
| 7,246,931 | B2 * | 7/2007 | Hsieh et al. .................... 362/612 |
| 7,254,309 | B1 | 8/2007 | Chou et al. |
| 7,275,849 | B2 * | 10/2007 | Chinniah et al. ............. 362/555 |
| 7,433,134 | B2 * | 10/2008 | Chou et al. .................... 359/726 |
| 7,465,075 | B2 * | 12/2008 | Chinniah et al. ............. 362/336 |
| 7,524,098 | B2 * | 4/2009 | Vennetier et al. ............. 362/555 |
| 7,540,635 | B2 * | 6/2009 | Kim et al. ..................... 362/327 |
| 7,703,950 | B2 * | 4/2010 | Ewert et al. ................... 362/339 |
| 8,235,556 | B2 * | 8/2012 | Munro et al. ................. 362/327 |

(Continued)

FOREIGN PATENT DOCUMENTS

WO  2007/081719 A2  7/2007

*Primary Examiner* — Hargobind S Sawhney
(74) *Attorney, Agent, or Firm* — LeClairRyan, a Professional Corporation

(57) ABSTRACT

A condensing element includes an outer section having a circumferential curved sidewall extending between a light input surface at one end and a light output surface at the other end that provides substantially total internal reflection of light emitted from the input surface and incident upon the sidewall of the outer section. A circumferential curved inner section is recessed within the outer section such that the light emitted from the input surface and incident upon the curved inner section is not incident upon the output surface. A circumferential substantially non-curved sidewall extends from the inner section to a circumferential substantially non-curved upper section positioned at approximately a 45° angle relative to the optical axis of the light emitted from the input surface. A light-absorbing plug is in communication with the upper section, wherein the light emitted from the input surface is condensed and directed in a sideways direction relative to the optical axis of the entering light.

18 Claims, 26 Drawing Sheets

(56) References Cited

U.S. PATENT DOCUMENTS

| | | | |
|---|---|---|---|
| 2002/0080615 A1* | 6/2002 | Marshall et al. | 362/333 |
| 2006/0067079 A1* | 3/2006 | Noh et al. | 362/327 |
| 2006/0083003 A1* | 4/2006 | Kim et al. | 362/327 |
| 2007/0195534 A1* | 8/2007 | Ha et al. | 362/327 |
| 2008/0074888 A1* | 3/2008 | Chang | 362/327 |
| 2008/0158881 A1* | 7/2008 | Liu et al. | 362/245 |
| 2008/0297918 A1* | 12/2008 | Park et al. | 359/709 |
| 2010/0097809 A1* | 4/2010 | Munro et al. | 362/308 |

* cited by examiner

| ρ (mm) | h₂ (mm) | θᵢ (degs) | θₛ (degs) |
|---|---|---|---|
| 1.000 | 0.1500 | 8.53 | 49.27 |
| 1.100 | 0.1213 | 13.86 | 51.93 |
| 1.200 | 0.2542 | 18.61 | 54.31 |
| 1.300 | 0.3986 | 22.88 | 56.44 |
| 1.400 | 0.5445 | 26.71 | 58.36 |
| 1.500 | 0.7219 | 30.17 | 60.08 |
| 1.600 | 0.9009 | 33.30 | 61.65 |
| 1.700 | 1.0914 | 36.14 | 63.07 |
| 1.800 | 1.2935 | 38.73 | 64.36 |
| 1.900 | 1.5070 | 41.09 | 65.55 |
| 2.000 | 1.7321 | 43.26 | 66.63 |
| 2.100 | 1.9687 | 45.25 | 67.63 |
| 2.200 | 2.2169 | 47.09 | 68.55 |
| 2.300 | 2.4765 | 48.79 | 69.40 |
| 2.400 | 2.7477 | 50.37 | 70.18 |
| 2.500 | 3.0304 | 51.83 | 70.92 |
| 2.600 | 3.3246 | 53.19 | 71.60 |
| 2.700 | 3.6303 | 54.46 | 72.23 |
| 2.800 | 3.9476 | 55.65 | 72.83 |
| 2.900 | 4.2763 | 56.77 | 73.38 |
| 3.000 | 4.6166 | 57.81 | 73.91 |

*FIG. 7*

| $\rho_1$ (mm) | $h_1$ (mm) | $\theta_H$ (degs) |
|---|---|---|
| 0.75 | 1.0000 | 23.453 |
| 0.70 | 0.9783 | 24.054 |
| 0.65 | 0.9560 | 24.691 |
| 0.60 | 0.9330 | 25.367 |
| 0.55 | 0.9093 | 26.085 |
| 0.50 | 0.8848 | 26.852 |
| 0.45 | 0.8598 | 27.670 |
| 0.40 | 0.8333 | 28.548 |
| 0.35 | 0.8061 | 29.491 |
| 0.30 | 0.7778 | 30.507 |
| 0.25 | 0.7483 | 31.606 |
| 0.20 | 0.7176 | 32.799 |
| 0.15 | 0.6854 | 34.099 |
| 0.10 | 0.6515 | 35.522 |
| 0.05 | 0.6158 | 37.086 |
| 0.00 | 0.5780 | -- |

*FIG. 11*

| θe | SOLID ANGLE SUBTENDED BY 2θe | SOLID ANGLE BEYOND θe | % OF HEMISPHERE BEYOND θe | SOURCE EMISSION BEYOND θe | APPROX % OF LIGHT EMITTED BEYOND θe |
|----|------|------|--------|--------|--------|
| 0  | 0.0000 | 6.2832 | 100.00% | 100.00% | 100.00% |
| 2  | 0.0038 | 6.2794 | 99.94% | 96.51% | 96.45% |
| 4  | 0.0153 | 6.2679 | 99.76% | 93.02% | 92.80% |
| 6  | 0.0344 | 6.2488 | 99.45% | 89.55% | 89.06% |
| 8  | 0.0611 | 6.2220 | 99.03% | 86.08% | 85.24% |
| 10 | 0.0955 | 6.1877 | 98.48% | 82.64% | 81.38% |
| 12 | 0.1373 | 6.1459 | 97.81% | 79.21% | 77.48% |
| 14 | 0.1866 | 6.0965 | 97.03% | 75.81% | 73.56% |
| 16 | 0.2434 | 6.0398 | 96.13% | 72.44% | 69.63% |
| 18 | 0.3075 | 5.9757 | 95.11% | 69.10% | 65.72% |
| 20 | 0.3789 | 5.9043 | 93.97% | 65.80% | 61.83% |
| 22 | 0.4575 | 5.8257 | 92.72% | 62.54% | 57.99% |
| 24 | 0.5432 | 5.7400 | 91.35% | 59.33% | 54.20% |
| 26 | 0.6359 | 5.6473 | 89.88% | 56.16% | 50.48% |
| 28 | 0.7355 | 5.5477 | 88.29% | 53.05% | 46.84% |
| 30 | 0.8418 | 5.4414 | 86.60% | 50.00% | 43.30% |
| 32 | 0.9547 | 5.3284 | 84.80% | 47.01% | 39.87% |
| 34 | 1.0742 | 5.2090 | 82.90% | 44.08% | 36.54% |
| 36 | 1.2000 | 5.0832 | 80.90% | 41.22% | 33.35% |
| 38 | 1.3320 | 4.9512 | 78.80% | 38.43% | 30.29% |
| 40 | 1.4700 | 4.8132 | 76.60% | 35.72% | 27.36% |
| 42 | 1.6139 | 4.6693 | 74.31% | 33.09% | 24.59% |
| 44 | 1.7634 | 4.5197 | 71.93% | 30.53% | 21.96% |
| 46 | 1.9185 | 4.3647 | 69.47% | 28.07% | 19.50% |
| 48 | 2.0789 | 4.2043 | 66.91% | 25.69% | 17.19% |
| 50 | 2.2444 | 4.0388 | 64.28% | 23.40% | 15.04% |
| 52 | 2.4149 | 3.8683 | 61.57% | 21.20% | 13.05% |
| 54 | 2.5900 | 3.6932 | 58.78% | 19.10% | 11.23% |
| 56 | 2.7697 | 3.5135 | 55.92% | 17.10% | 9.56% |
| 58 | 2.9536 | 3.3296 | 52.99% | 15.20% | 8.05% |
| 60 | 3.1416 | 3.1416 | 50.00% | 13.40% | 6.70% |
| 62 | 3.3334 | 2.9498 | 46.95% | 11.71% | 5.50% |
| 64 | 3.5288 | 2.7544 | 43.84% | 10.12% | 4.44% |
| 66 | 3.7276 | 2.5556 | 40.67% | 8.65% | 3.52% |
| 68 | 3.9295 | 2.3537 | 37.46% | 7.28% | 2.73% |
| 70 | 4.1342 | 2.1490 | 34.20% | 6.03% | 2.06% |
| 72 | 4.3416 | 1.9416 | 30.90% | 4.89% | 1.51% |
| 74 | 4.5513 | 1.7319 | 27.56% | 3.87% | 1.07% |
| 76 | 4.7631 | 1.5200 | 24.19% | 2.97% | 0.72% |
| 78 | 4.9768 | 1.3063 | 20.79% | 2.19% | 0.45% |
| 80 | 5.1921 | 1.0911 | 17.36% | 1.52% | 0.26% |
| 82 | 5.4087 | 0.8745 | 13.92% | 0.97% | 0.14% |
| 84 | 5.6264 | 0.6568 | 10.45% | 0.55% | 0.06% |
| 86 | 5.8449 | 0.4383 | 6.98% | 0.24% | 0.02% |
| 88 | 6.0639 | 0.2193 | 3.49% | 0.06% | 0.00% |
| 90 | 6.2832 | 0.0000 | 0.00% | 0.00% | 0.00% |

*FIG. 24*

SIDE-EMITTING OPTICAL ELEMENTS AND METHODS THEREOF

FIELD OF THE INVENTION

This invention generally relates to optical elements and, more particularly, to side-emitting, optical elements and methods thereof.

BACKGROUND

Typically, a light emitting diode (LED) die emits light into a full hemisphere. For some applications, such as for general room lighting, such an output can be desirable. However, for other applications, such as for display-panel backlighting, a side-to-side output emission can be required. Typically, in such applications it is desirable that the light is emitted into only a few degrees of angle relative to a display-panel viewing plane, so the light can become homogenized before exiting the backlight.

A variety of devices have been developed to condense an LEDs hemispherical emission and redirect it into sideways direction. Unfortunately, none of these prior devices perform efficiently and generally emit light into a broad exit angle, or into other unmanageable directions.

One such well-known side-emitting optical 1, element is illustrated in FIG. 1. This optical element is comprised of a lower refractive section 2, and an upper TIRing section 4. Rays, such as ray 8, that are emitted from the source 14 in a direction within 30 degrees of parallel with the optical axis 3 enter the upper TIRing section 4, whereupon they TIR from an upper surface 5 and are directed to an output surface 6. These rays then refract through the output surface 6 into a direction that is somewhat perpendicular to the optical axis 3.

Other rays, such as ray 6, that are emitted from the source 14 in a direction greater than about 30 degrees from the optical axis 3 enter the lower refractive section 2, whereupon they are incident on output surface 9. These rays refract through the output surface 9 into a direction that is somewhat perpendicular to the optical axis 3.

Yet other rays, such as ray 10, that are incident on the upper surface 5 of the upper TIRing section 4 at or near where the optical axis 3 intersects the upper surface 5, will refract through upper surface 5 into a non-side-emitting, or non-radial, direction. These rays intersect the upper surface 5 at or near the apex of the upper surface. Ideally the apex is dead-sharp, but because of non-ideal manufacturing processes the apex will have a non-zero radius of curvature, and will also be non-zero in size. Light rays such as ray 10 will refract through this section into a non-controlled, non-radial, and undesirable direction.

It is difficult to block rays such as ray 10 by installing a plug into the recess 11, because the plug will need to be in optical contact with the upper surface 5, which will destroy the TIRing property of the upper surface 5, and compromise the performance of the optical element 1. Furthermore, the plug cannot be placed into the recess and be expected to stay in place due to friction, which necessitates the use of an adhesive along upper surface 5, which will further compromise the TIRing performance of the upper surface 5 and degrade the performance optical element 1.

Because of the stray light rays, such as ray 10, the inability to block them at the upper surface 5, and the generally poor side-emission characteristics of the optical element 1, the optical element 1 is undesirable to use in many applications.

SUMMARY

An optical element in accordance with embodiments of the present invention includes an outer TIRing section having a circumferential curved sidewall between a light input surface at one end and a light output section at the upper end that provides substantially total internal reflection of light emitted from the input surface and incident upon the sidewall of the lower section. A conical TIRing upper surface in conjunction with a cylindrical output surface constitutes a light output section, that redirects light input to it from the lower TIRing section into a substantially radial direction. Lastly, a section that is recessed within the outer TIRing section and the upper light output section intercepts light from the source and prevents it from directly reaching the output section, and instead by TIR redirects the light so that it passes through a lower portion of the outer TIRing section such that the light exits into a substantially radial direction.

An opaque plug can be provided to fit in the recess of the present invention that serves to block stray light from exiting in an axial direction, wherein the plug is only in optical contact with the sidewalls of the inner recess so that the TIR capabilities of the conical TIRing upper surface and the lower TIRing surface are not compromised.

Accordingly, the present invention provides an optical element that may be optically coupled to one or more LED sources to provide low-loss light concentration in a radial direction. Additionally, the present invention provides a condensing element that is easy and inexpensive to manufacture and which has a compact design.

BRIEF DESCRIPTION OF THE DRAWINGS

FIG. 7 is a table of coordinate values defining an exemplary TIRing outer section surface of the present invention;

FIG. 11 is a table of coordinate values defining an exemplary TIRing inner surface of the present invention;

FIG. 24 is a table of light emissions and collection efficiencies in accordance with an exemplary embodiment of the present invention;

DETAILED DESCRIPTION

The present invention relates to a compact and highly efficient optical element that is well suited to collecting the light emitted from a source, and redirecting the light so that it exits the optical element in a sideways direction. An optical element 20 in accordance with embodiments of the present invention is illustrated in cross-section in FIG. 2.

Figure 1:
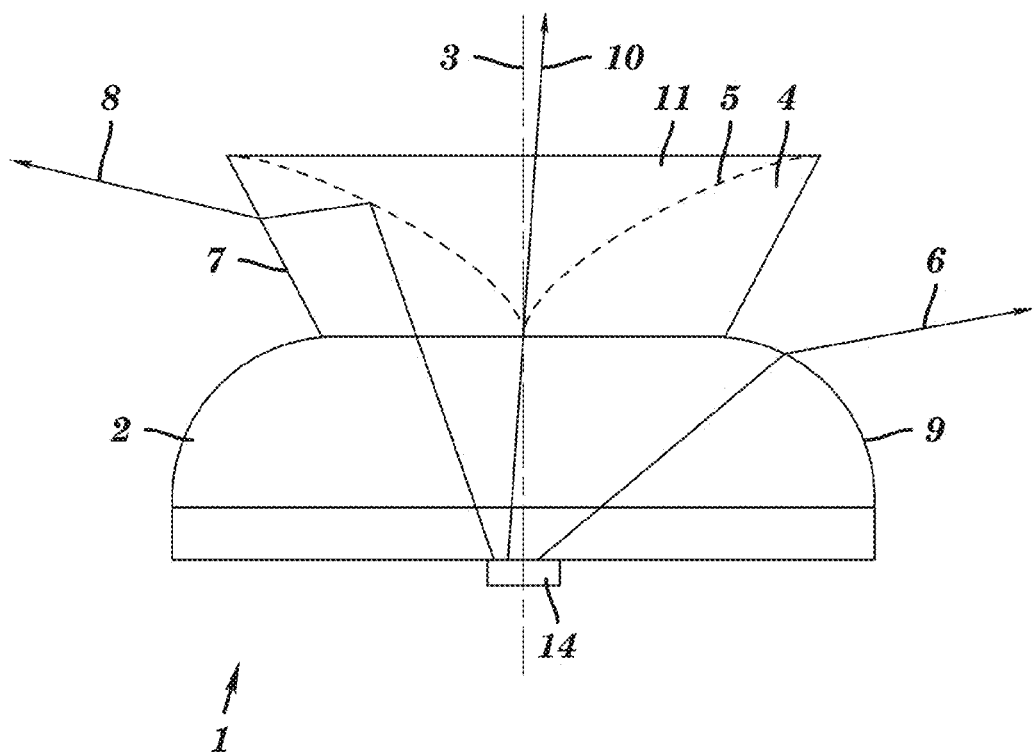
FIG. 1 is a cross-sectional view of a prior-art side-emitting optical element.
Figure 2:
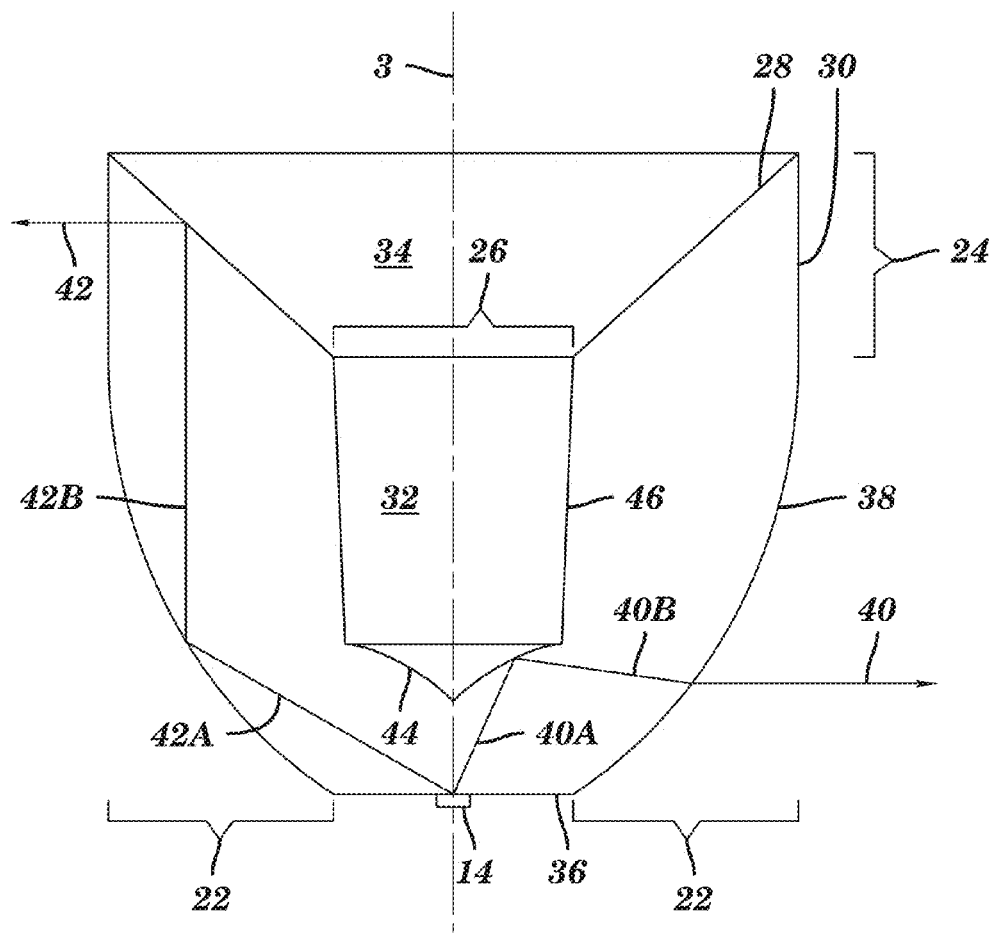
FIG. 2 is a cross-sectional view of an optical element in accordance with exemplary embodiments of the present invention.

Referring to FIG. 2, the present invention 20 consists of three main sections: an outer TIRing section 22, an upper output section 24, and an inner recessed section 26. The outer TIRing section 22, the upper output section 24, and the inner recessed section 26 are integrally formed together, although these sections can be formed or connected together in other manners.

The upper output section 24 consists of a conical-shaped (in non-cross-section) TIRing surface 28 and a cylindrical-shaped (in non-cross-section) output surface 30. The inner recessed section 26 consists of a recess 32 at the bottom of which is located a TIRing surface 44. The inner recessed section 26 is located below the conical void 34 bounded by the TIRing surface 28. Finally, an input surface 36 is located at the bottom of the present invention 20, and is bounded by the inner recessed section 26 and the outer TIRing section 22.

Typically the outer TIRing section 22, the upper output section 24, the inner recessed section 26, the conical-shaped TIRing surface 28, the cylindrical-shaped output surface 30, the recess 32, the conical void 34, and the input surface 36 are circularly symmetric about an optical axis 3, although they can be asymmetric as well in order to obtain special non-radially symmetric light output distributions.

A light source 14 is normally situated at the input surface 36, at the optical axis 3. Typically, the input surface 36 is a few millimeters wide, and is plano, as shown in FIG. 2. The light source 14 is typically an LED die or chip, and is in optical contact with the optical element 20.

Figure 26:
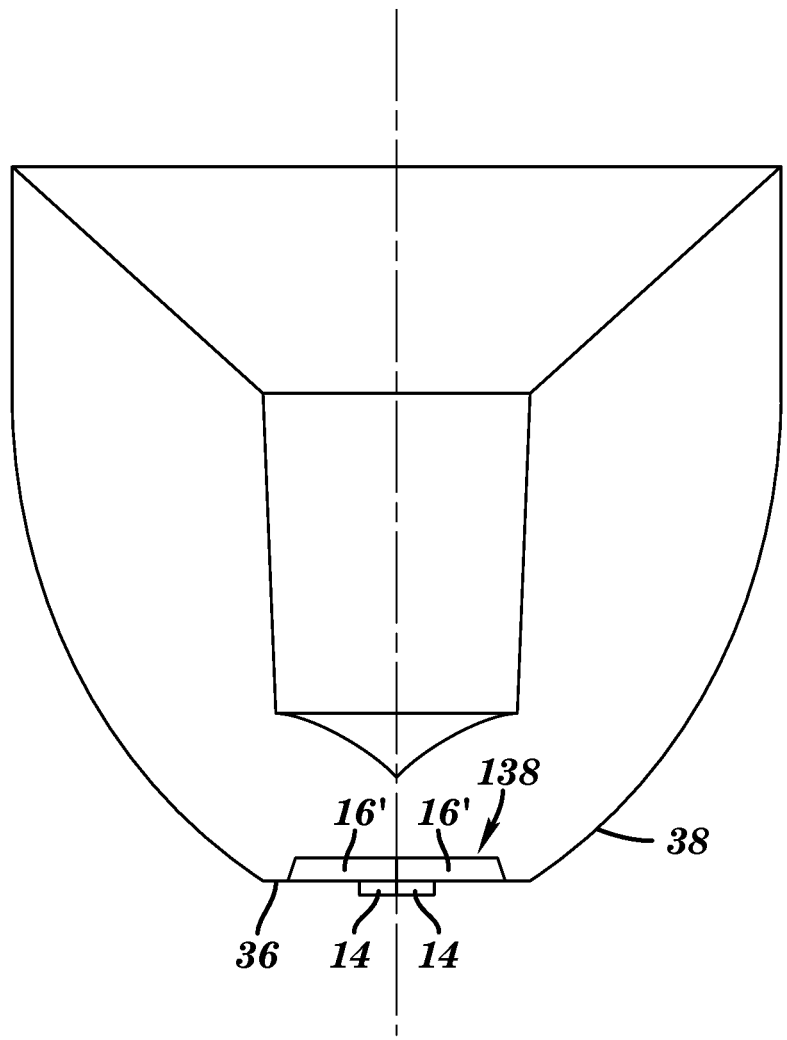
FIG. 26 is a cross-sectional view of another side-emitting optical element in accordance with the present invention in which a recess has been provided to facilitate attachment of the side-emitting optical element.

The light source 14 may be a colored light source, such as red, green or blue or contain phosphor to emit a white colored light. Another way in which to generate white light may include providing red, green, and blue colored LEDs in combination. The present invention may utilize a single source 14, although other numbers and/or types of light sources could be used with the optical element 20. However, when using more than one light source, the sources should be close to one another and near the optical axis 3. By way of example only, multiple light sources 14 about the optical axis are illustrated in FIG. 26. The source 14 can be an inorganic material, (e.g., ILED), although other types of light sources can be used, such as a light source made from organic materials (e.g., OLEDs). Source 14 is preferably in chip or die format, although the light source can come in other formats, can have leads, and can subsequently be incorporated in the optical element 10. The LED die can be leaded and subsequently encapsulated in the optical element 10, and used as a discrete (one-up) component.

Light from the source 14 is typically emitted into a full Lambertian hemisphere into the optical element 20, although other distributions may be utilized, and the input distribution may be less than a full hemisphere.

Referring more specifically to FIG. 2, the optical element 20 is formed as a monolithic structure, although the optical element 20 can formed as two or more structures. The optical element 20 may be made of glass, although it can be made of other types and numbers of materials, such as a polymer. Preferred polymers include acrylic and polycarbonate. Preferably, the optical element 20 is made with an injection molding process as known in the art. Additionally, the material of the optical element 20 has a refractive index between about 1.4 and 1.7, although the optical element could include other ranges for the refractive index.

The TIRing section 22 has a one-sided, rotationally symmetric configuration, although the TIRing section 22 may have other types and numbers of sides, shapes, and configurations, such as four-sided, six-sided, eight-sided, triangular, square, and rectangular and could have an asymmetric configuration. The TIRing section 22 has a circumferential curved sidewall 38 between a light input surface 36 at one end and a light output surface 30 at the other end that provides a substantially total internal reflection of light emitted from the source 14 and incident upon the sidewall 38, although the TIRing section 22 may have other numbers and types of top, bottom and side walls.

The light input surface 36 has a plano configuration to facilitate the attachment of a light source 14, such as an LED, although the light input surface 36 may have other configurations, such as convex or concave, or have a recess or protrusion to facilitate placement, installation, or attachment of the source 14.

The sidewall 38 is formed to have a curvature that provides substantially total internal reflection (TIR) of light entering at the light input surface 36 although the sidewall 38 could have other properties and configurations. In particular, the slope angle of the sidewall 38 is selected so that light from the source 14 will be substantially totally internal reflected at all locations on the sidewall 38.

Ideally after light rays from the source 14 are TIRed by the sidewall 38, they are directed into a direction that is substantially parallel to the optical axis 3, as illustrated by ray-segment 42B in FIG. 2. These rays then become incident upon TIRing surface 28, which totally internally reflects these rays into a substantially radial direction as illustrated by ray 42. These rays then refract through the cylindrical output surface 30, maintain their radially oriented direction, and leave the optical element 20 in a side-emitting orientation.

Figure 8:
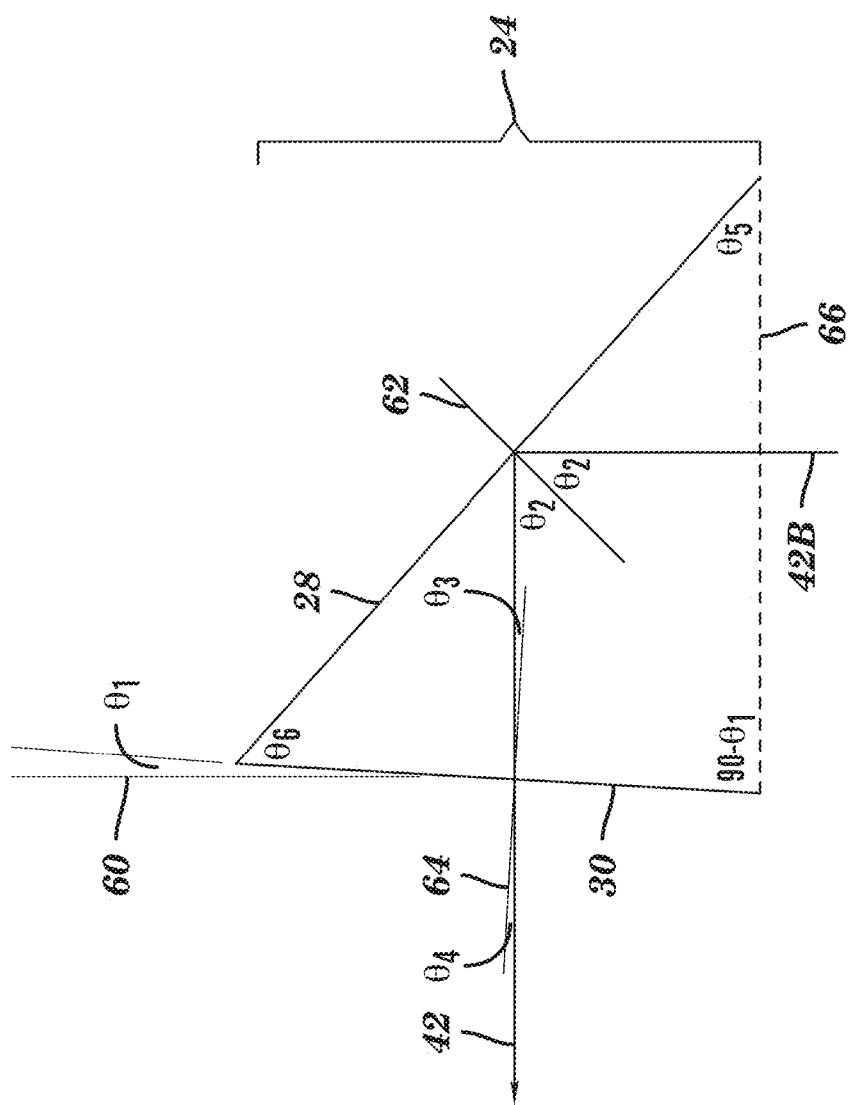
FIG. 8 is a diagram of an example of the geometrical calculations for the design of the output section of the present invention.

To facilitate molding, in particular the mold-release operation of an injection molding process, the cylindrical output surface 30 can be made non-cylindrical, and have a slight inward angle as illustrated by $\theta_1$ in FIG. 8. This additional angle $\theta_1$ tends to complicate the design of the upper output section 24, as the cross-sectional angle, $\theta_5$ of FIG. 8, of the TIRing surface 28, is no longer 45°. The calculation for $\theta_5$ and other angles are presented below.

The inner surface 44 of the inner recessed section 26 has a rotationally symmetric configuration about and tapers to an end point at an optical axis 3, although the inner surface 44 may have other configurations and other types and numbers of sides, such as four-sided, six-sided, eight-sided, triangular, square, and rectangular and could have an asymmetric configuration.

Figure 25:
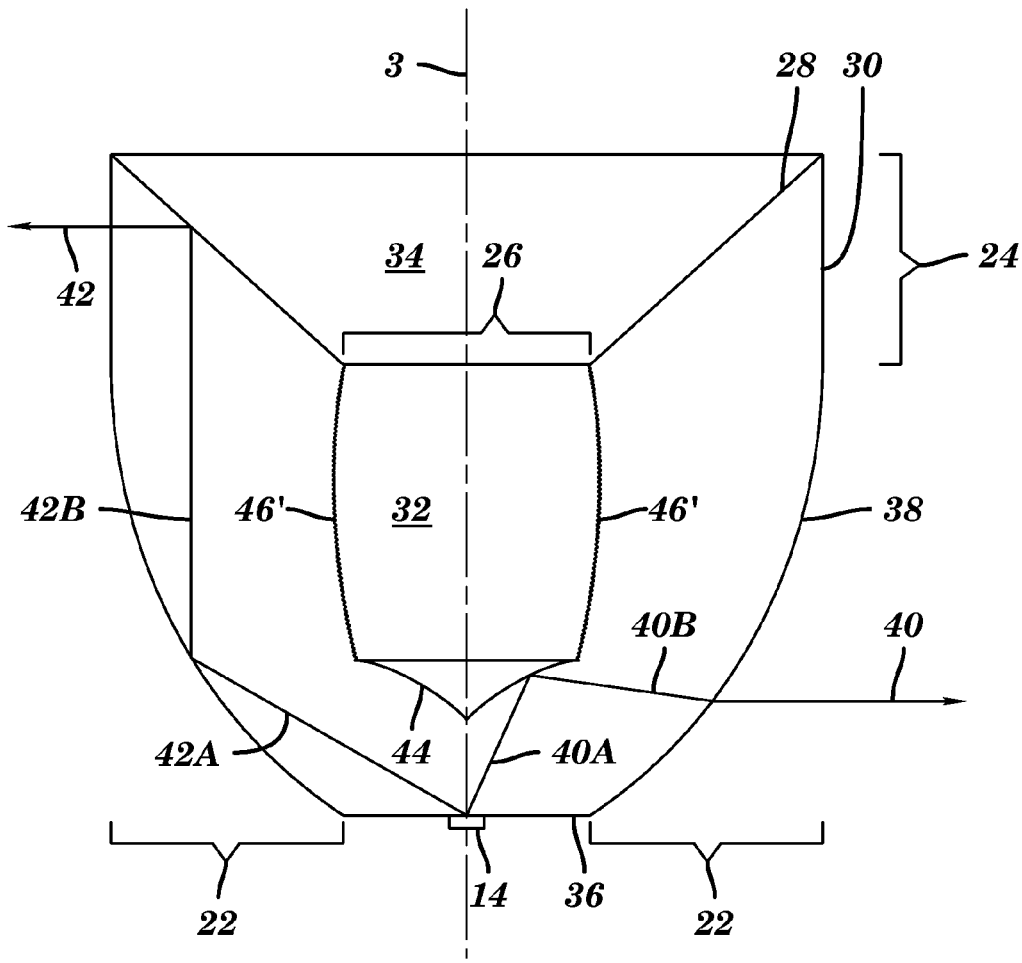
FIG. 25 is a cross-sectional view of another optical element in accordance with exemplary embodiments of the present invention.

The inner recessed section 26 also has a sidewall 46 which is formed to be substantially linear or non-curved in cross-section, whose sides may be parallel to an optical axis 3. However, the sides of sidewall 46 are generally not parallel to the optical axis 3, such that the diameter of the recess 32 is greater at the top (or opening end) than at the bottom of the recess 32, to facilitate removal of the optical element 20 from the mold during manufacturing. The sidewall surface 46 may also be symmetric about an optical axis 3, but may be asymmetric, or may have other numbers and types of walls in other shapes and configurations, such as concave, convex, parabolic, elliptical, or otherwise characterized by a polynomial. By way of example only, FIG. 25 illustrates sidewalls 46' that are non-linear in cross-section (curved in this embodiment), textured, and made from a light diffusing material.

The purpose of the inner surface 44 is to TIR all light rays that are incident upon it, such as ray-segment 40A, from the source 14 into a somewhat radial direction as illustrated by ray-segment 40B. These rays are then incident on the outer TIRing surface 38, and refract through it into a radial output direction as illustrated by ray 40. Clearly the design of the inner surface 44 must take into account the surface profile of the TIRing outer surface 38 so that the emitted rays 40 are directed into a sideways or radial direction.

Figure 3:
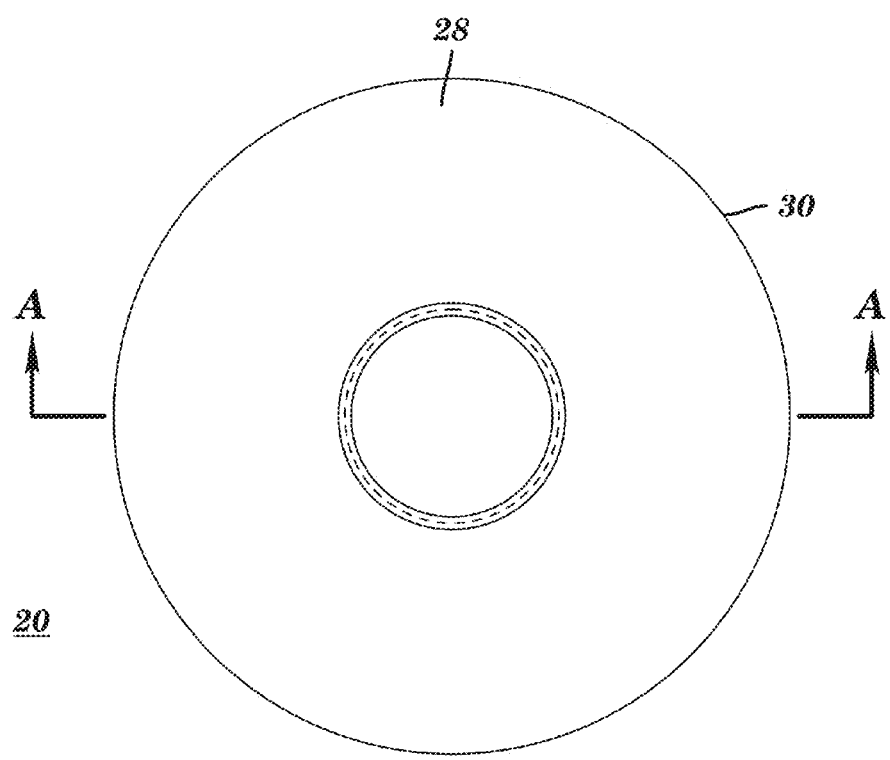
FIG. 3 is a top-view of an optical element in accordance with exemplary embodiments of the present invention.

FIG. 3 presents a top-view of the optical element 20 of the present invention, and illustrates a section A-A along which the section drawing of FIG. 2 was generated. FIG. 3 also illustrates the location of the conical-shaped TIRing surface 28 and the circumferential output surface 30.

Figure 4:
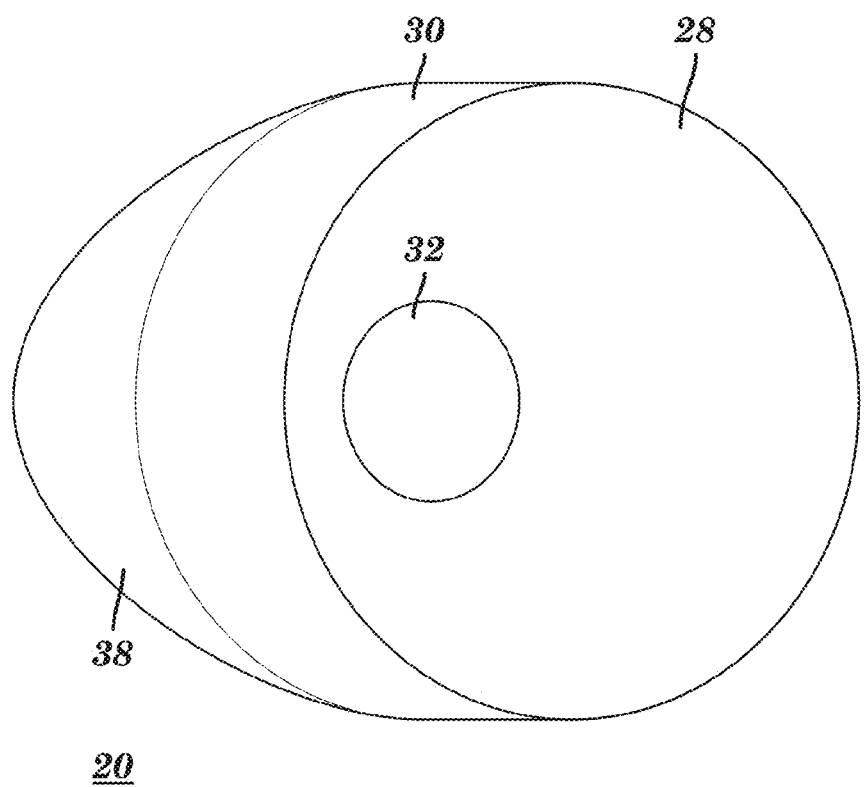
FIG. 4 is an isometric view of an optical element in accordance with the present invention.

An isometric view of the optical element 20 is presented in FIG. 4. In this view the locations of the conical-shaped TIRing surface 28, the circumferential output surface 30, the circumferential outer TIRing surface 38, and the inner recess 32 are clearly shown.

Figure 5:
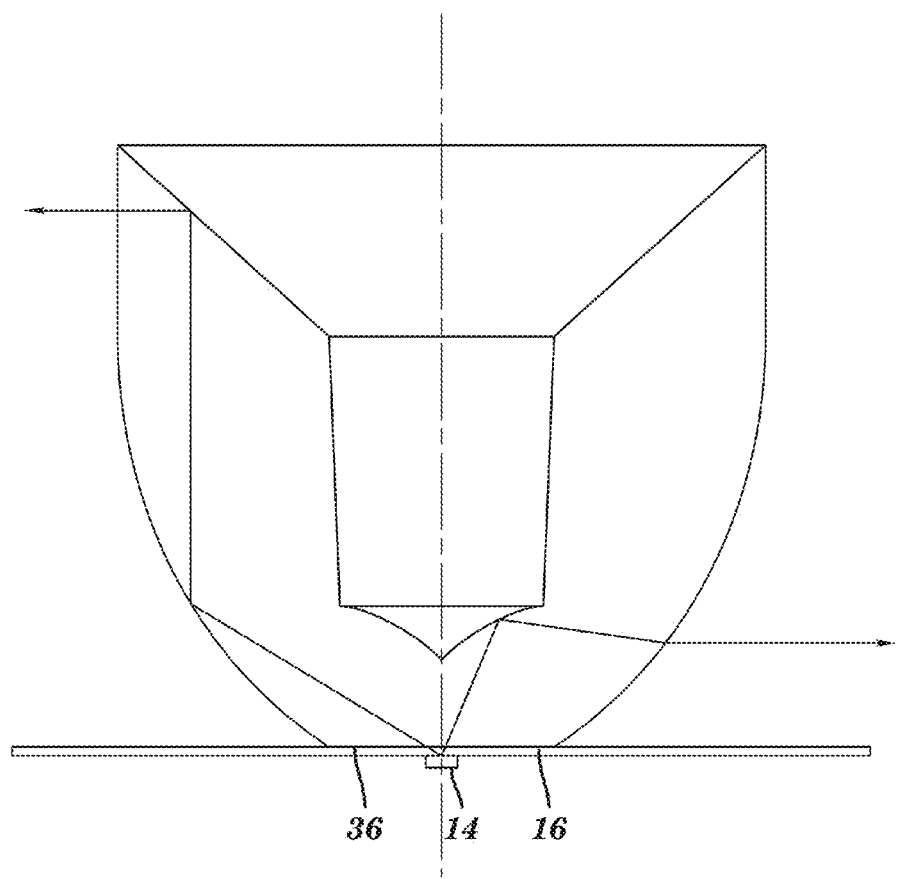
FIG. 5 is a cross-sectional view of a side-emitting optical element in accordance with the present invention in which a layer of material has been placed between the source and the side-emitting optical element.

In FIG. 5 is shown an alternate configuration of the present invention in which an additional layer 16 or film of is provided between the source 14 and the input surface 36. The layer 16 can be used to facilitate the encapsulation of the source 14 so that it is not exposed to atmospheric elements for a long period of time before it can be bonded to the input surface 36. The layer 16 can be made from organic materials, such as polymer, particularly acrylic, polycarbonate, PET, PEN, or the like, and can be between 0.02 mm and 2 mm in thickness. Furthermore, a thin layer of adhesive, particularly pressure sensitive adhesive (PSA), not shown, can be provided between the film layer 16 and the input surface 36 to facilitate bonding of the film layer 16, or equivalently the source structure to the optical element 20. For the geometric calculations presented below, a 0.125 mm layer of film 16 and a 0.025 mm layer of PSA will be assumed.

The operation of the condensing element 20 will now be described with reference to FIGS. 2. In FIG. 2, it can be seen that the rays emitted by the source 14 into a hemisphere are treated in two different ways by the optical element 20. A light ray 42A that exits obliquely from the source 14 becomes incident onto the TIRing outer surface 38. The curvature of the TIRing outer surface 38 provides total internal reflection of this transmitted light. After the TIR, the light ray 42B becomes directed into a direction that is substantially parallel to the optical axis 3. Light ray 42B is then incident onto a conical, non-curved in cross-section TIRing surface 28 of the upper output section 24, whose angle is approximately 45° relative to the optical axis 3. The light output surface 30 can be slightly conical so that the optical element can be easily removed from a molding machine. In this case, the slope angle of the TIRing surface 28 of the upper output section 24 can be adjusted so that light still exits from the light output surface 30 perpendicular to the optical axis 3.

A light ray 40B that exits the source 14 non-obliquely, within a cone subtending about ±30° relative to the optical axis 3, becomes incident on the inner TIRing surface 44 of the inner recessed section 26, whose prescription is designed to allow the light ray 40B to TIR, as well as be directed into a substantially sideways direction relative to the optical axis 3. The reflected light ray 40B is then incident on the TIRing outer surface 38 of the outer TIRing section 22, whereupon the ray 40B undergoes refraction and exits through the outer surface 38 in a direction substantially perpendicular to the optical axis 3.

Note that the angle of incidence of ray-segment 40B on the outer TIRing surface 38 does not exceed the critical angle, and therefore does not TIR, but instead refracts through the outer TIRing surface 38. On the other hand ray-segment 42A is obliquely incident on the outer TIRing outer surface 38, and since its angle of incidence exceeds the critical angle, ray 42A will TIR instead of refract through the outer TIRing surface 38.

Figure 6:
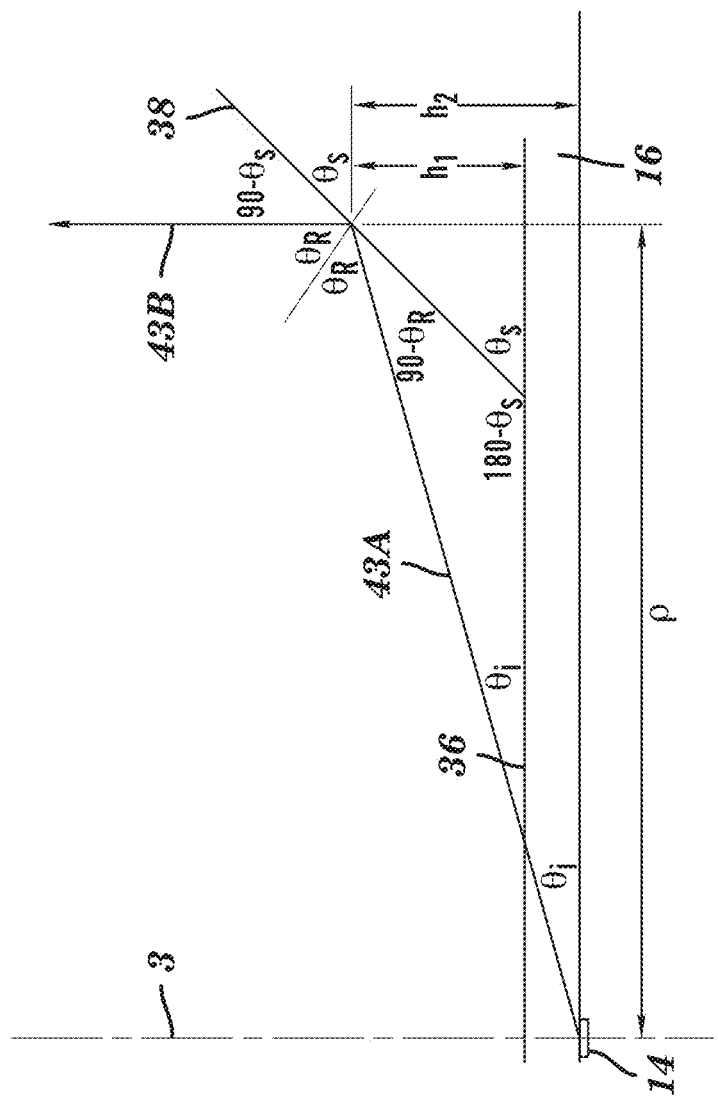
FIG. 6 is a diagram of an example of geometrical calculations for generating a TIRing outer section of the present invention.

A diagram illustrating an example of the geometrical calculations for determining the curvature of the TIRing outer surface 38 is illustrated in FIG. 6. Again the requirements for this surface are 1) the rays must TIR, and 2) they must be TIRed into a direction substantially parallel to the optical axis 3 so they can be properly managed by the output section 24.

In these calculations, the variables are:

$\Theta_i$: The light exit angle from the source 14 with respect to the light input surface 36;

$\Theta_S$: The instantaneous angle of a differential TIRing surface element of the TIRing outer surface 38 with respect to the light input surface 36;

$\Theta_R$: The angle of incidence that the light makes with the differential surface element of the TIRing outer surface 38;

$h_1$: The vertical distance from the base of the input surface 36 to the rays point of incidence on the TIRing outer surface 38;

$h_2$: The vertical distance from the source 14 to the rays point of incidence on the TIRing outer surface 38;

ρ: The radial distance from the light source 14 to the point of incidence on the TIRing outer surface 38.

Additionally, in these calculations $\tan \Theta_i = h_2/\rho$ which can be restated as $$\Theta_i = \tan^{-1}(h_2/\rho). \quad \text{(Equation 1)}$$

Also, by inspection $$180 = \Theta_R + \Theta_R + (90 - \Theta_R) + (90 - \Theta_S) \quad \text{(Equation 2)}$$

or equivalently $$\Theta_S = \Theta_R. \quad \text{(Equation 3)}$$

Also $$180 = \Theta_i + (180 - \Theta_S) + (90 - \Theta_R) \quad \text{(Equation 4)}$$

which simplifies to $$\Theta_S = \Theta_i - \Theta_R + 90 \quad \text{(Equation 5)}$$

and combining equations 1, 3, and 5 we have:

$$\Theta_S = \tan^{-1}(h_2/\rho)/2 + 45°. \quad \text{(Equation 6)}$$

A spreadsheet can be prepared from these calculations with the coordinates of the profile, ρ and $h_2$, as input variables, and the instantaneous slope $\Theta_S$ of the TIRing outer surface 38 as the output variable. For the optical element 20 of the present invention, such a spreadsheet is presented in FIG. 7. The design of the TIRing outer surface 38 is fairly straightforward and related to the simple Law of Reflection in order to compute the slopes of the curve (provided the angle of incidence of the light on the surface exceeds the critical angle for all points of incidence, which occurs for any material having a critical angle less than 45 degrees).

The design of the output section 24 will now be discussed with reference to FIG. 8. In FIG. 8, an exemplary ray 42B is directed into the output section 24 from the TIRing outer surface 38 as described earlier. This ray then TIRs from surface 28 with an angle $\Theta_2$, and is then incident on the light output surface 30 with an angle $\Theta_3$, which then refracts through the output surface 30 with angle $\Theta_4$. Ideally the output ray 42 is perpendicular to the optical axis 3, or equivalently is parallel to a line 60 which is parallel to the optical axis 3. Ray-segment 42B is also nominally parallel to the optical axis 3. Line segment 62 is perpendicular to the TIRing surface 28; line segment 64 is perpendicular to the output surface 30; virtual line 66 is perpendicular to the optical axis 3; and $\Theta_6$ is the angle of the apex of the output section 24. The two variables that are available to the designer are the angle $\Theta_5$ of the TIRing surface, and the draft angle $\Theta_1$ of the output surface 30.

The goal of the design effort is to determine values of $\Theta_1$ and $\Theta_5$ so that $\Theta_4 = \Theta_1$. By inspection we have:

$$\Theta_3 = a \sin [\sin(\Theta_1)/n] \quad \text{Equation 7}$$

$$\Theta_6 = \Theta_3 + \Theta_2 \quad \text{Equation 8}$$

$$90 = \Theta_6 + \Theta_5 - \Theta_1 \quad \text{Equation 9}$$

$$\Theta_5 = \Theta_2 \quad \text{Equation 10}$$

where n is the refractive index of the material constituting the output section 24. This set of four equations has six variables, which can be constrained by picking a value for any two of the six variables. A good choice is to select $\Theta_1$ to be 3° (a nominal draft angle) and n=1.50, in which case $\Theta_3 = 2°$, $\Theta_5 = 45.5°$, and $\Theta_6 = 47.5°$. Under these conditions, the exiting ray 42 propagates out of the optical element 10 in a direction perpendicular to the optical axis 3.

Figure 9:
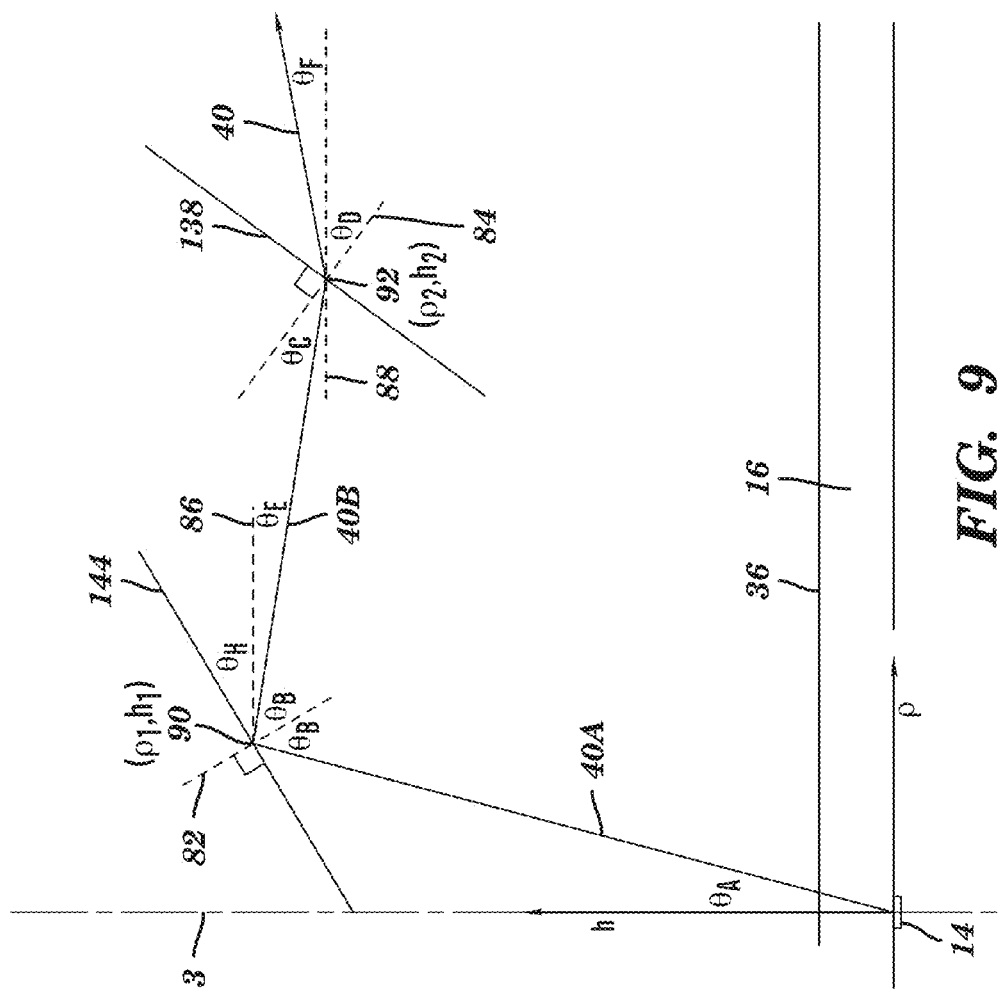
FIG. 9 is a diagram of an example of the geometrical calculations for the design of the TIRing inner surface of the present invention.
Figure 10:
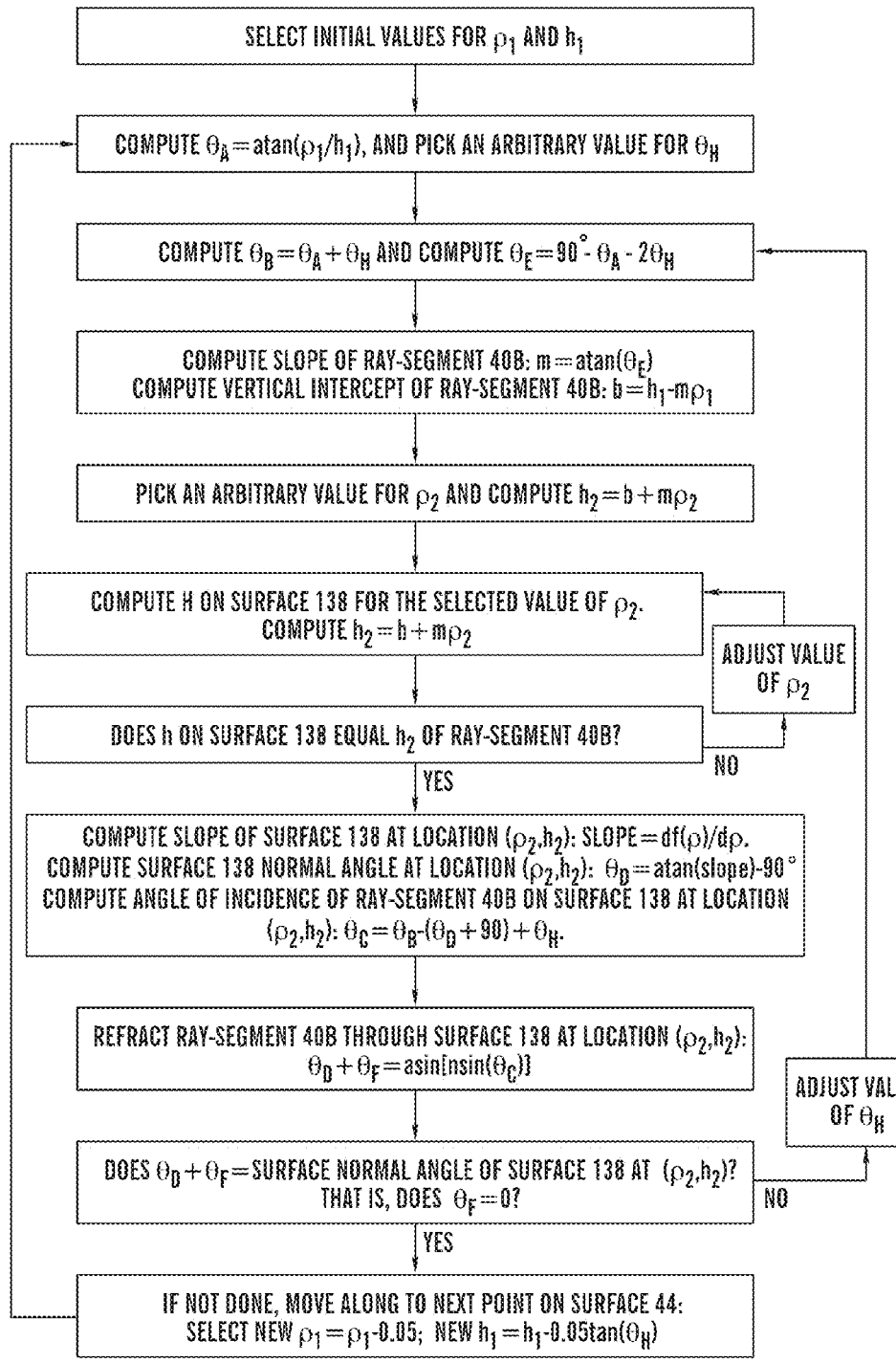
FIG. 10 is a flowchart illustrating a sequence of steps for designing the TIRing inner surface of the present invention.

The process for designing the inner recessed surface 44 will be described with the illustration presented in FIG. 9 and the flowchart presented in FIG. 10, culminating in the design data presented in the table of FIG. 11. In FIG. 9, light ray 40A exits the source 14 at angle $\Theta_A$ with the optical axis 3 and propagates through the film layer 16, through the input surface 36 of the optical element. Ray 40A is subsequently incident upon a differential element 144 of the inner TIRing surface 44 at location 90 having coordinates $(\rho_1, h_1)$, and making an angle of incidence $\Theta_B$ relative to line 82 perpendicular to the differential element 144. Ray 40A then TIRs off of the differential element 144, into ray-segment 40B, having a downward sloping angle $\Theta_E$ relative to a radial reference line 86. Ray-segment 40B is then incident on a differential element 138 of outer TIRing surface 38 at location 92 having coordinates $(\rho_2, h_2)$. Ray-segment 40B makes an angle of incidence of $\Theta_C$ relative to line 84 perpendicular to the differential element 138. Finally, ray-segment 40B refracts through differential element 138 into ray 40, which exits at an angle $\Theta_F$ relative to a radial reference line 88 and at an angle $\Theta_D$ relative to a line 84 perpendicular to the differential element 138.

Before the design of the inner TIRing surface 44 can commence, the prescription of the outer TIRing surface 38 must be ascertained as described previously. The design of the inner TIRing surface 44 is done in several steps, two of which are iterative, as illustrated in the flowchart in FIG. 10. First, a location of incidence 90 of the input ray 40A on the TIRing inner surface 44 is selected, along with the slope $\Theta_H$ of the differential surface element 144. The angles of reflection $\Theta_B$ and $\Theta_E$ of ray-segment 40B are then computed, and the point of incidence 92 of ray-segment 40B on differential surface element 138 is then iteratively computed. Next the angles of incidence $\Theta_C$ and $\Theta_D$ of ray-segment 40B is calculated, and ray-segment 40B is refracted through differential surface element 138 by the calculation of exit angle $\Theta_F$. If $\Theta_F = 0°$, then the exiting ray 40 exits in a radial or side-to-side direction, and the earlier estimate for $\Theta_H$ was correct. However, it is likely that $\Theta_F \neq 0°$, and $\Theta_H$ needs to be adjusted. If $\Theta_F > 0°$, then $\Theta_H$ needs to be increased, or decreased if $\Theta_F < 0°$. In either case, after a new estimate of $\Theta_H$ is made, the cycle of tracing ray-segment 40B and ray 40 repeats, iteratively until $\Theta_F = 0°$, at which point a new location 90 on a new differential surface element 144 is selected, and the process is repeated until the entire inner TIRing surface 44 is defined in a piece-wise linear fashion.

One such piece-wise linear definition of the inner TIRing surface 44 is presented in the table of FIG. 11. In this table a series of points 90 and differential slope angles $\Theta_H$ are presented for an inner TIRing surface 44 that works in conjunction with the outer TIRing surface 38 prescribed in the table of FIG. 7.

One key feature of the optical element 20 is that light emitted from a source 14 is not allowed to directly enter the upper output section 24. Recall that the upper output section 24 is optimized to accept input light that is substantially parallel to the optical axis 3. Should light from the source 14 enter the upper output section 24, it would necessarily enter from a direction that is not parallel to the optical axis 3 in which case it would not be properly redirected by the upper output section 24, and would exit from the upper output section 24 in an uncontrolled and undesirable direction.

Light from the source 14 is prevented from entering the upper output section by the location and diameter of the inner TIRing surface 44. Any light from the source 14 that would propagate to the upper output section 24 is instead always incident on the inner TIRing surface 44. That is, the upper output section 24 resides in the shadow of the inner TIRing surface 44. Care must be taken to ensure that inner TIRing surface 44 is wide enough and low enough in the inner recessed section 26 to prevent all rays from the source 14 from directly entering the upper output section 24. Of course oblique rays, such as rays 42A, 42B, 42, that indirectly enter the upper output section 24 by way of the outer TIRing section 22 are allowed.

There are two conditions that are considered for determining the relative sizes of the inner TIRing surface 44 of inner recessed section 26, the input surface 36, and the conical TIRing surface 28 of the upper section 24. The first condition is illustrated by a ray which represents light emitted form the source nearly perpendicular to the optical axis 3. The ray exits from the source 14 in a direction nearly perpendicular to the optical axis 3, and is incident upon the outer TIRing surface 38 very near the input surface 36. The ray is then TIRed into a direction substantially parallel to the optical axis 3. This ray misses the outer perimeter of the inner TIRing surface 44 of inner recessed section 26 as it propagates towards the conical TIRing surface 28 of the upper output section 24. That is, the position of the start of the surface of the outer TIRing section surface 38 at the input surface 36 must be large enough so that the ray misses the outer perimeter of the inner TIRing surface 44. Thus, the diameter of the input surface 36 is greater than or equal to the diameter of the inner TIRing surface 44 of inner recessed section 26.

The recess sidewall 46 is typically drafted to facilitate molding of the optical element 20 in accordance with manufacturing techniques known to those skilled in the art. Additional clearance can be provided to ensure that rays exiting from the source 14 in a direction nearly perpendicular to the optical axis 3 also miss the sidewall 46 of the recess 32. Thus, the diameter of the input surface 36 should be greater than or equal to the diameter of the opening of the recess 32 where it intersects the conical TIRing surface 28 of the upper section 24.

The second condition to be considered in determining the relative sizes of the TIRing surface of inner section 44, the input surface 36, the conical TIRing surface 28 is illustrated by a marginal ray. The marginal ray is representative of rays that miss the periphery of the inner TIRing surface 44 of inner recessed section 26 by a small amount, and are incident on the outer TIRing surface 38 of the outer TIRing section 22. To ensure that a ray from the source 14 is not directly incident on the output surface 30, the height of the outer TIRing section 22 can be increased, so that upper output surface 30 begins well above the intersection point of the ray on the outer surface.

Figure 12:
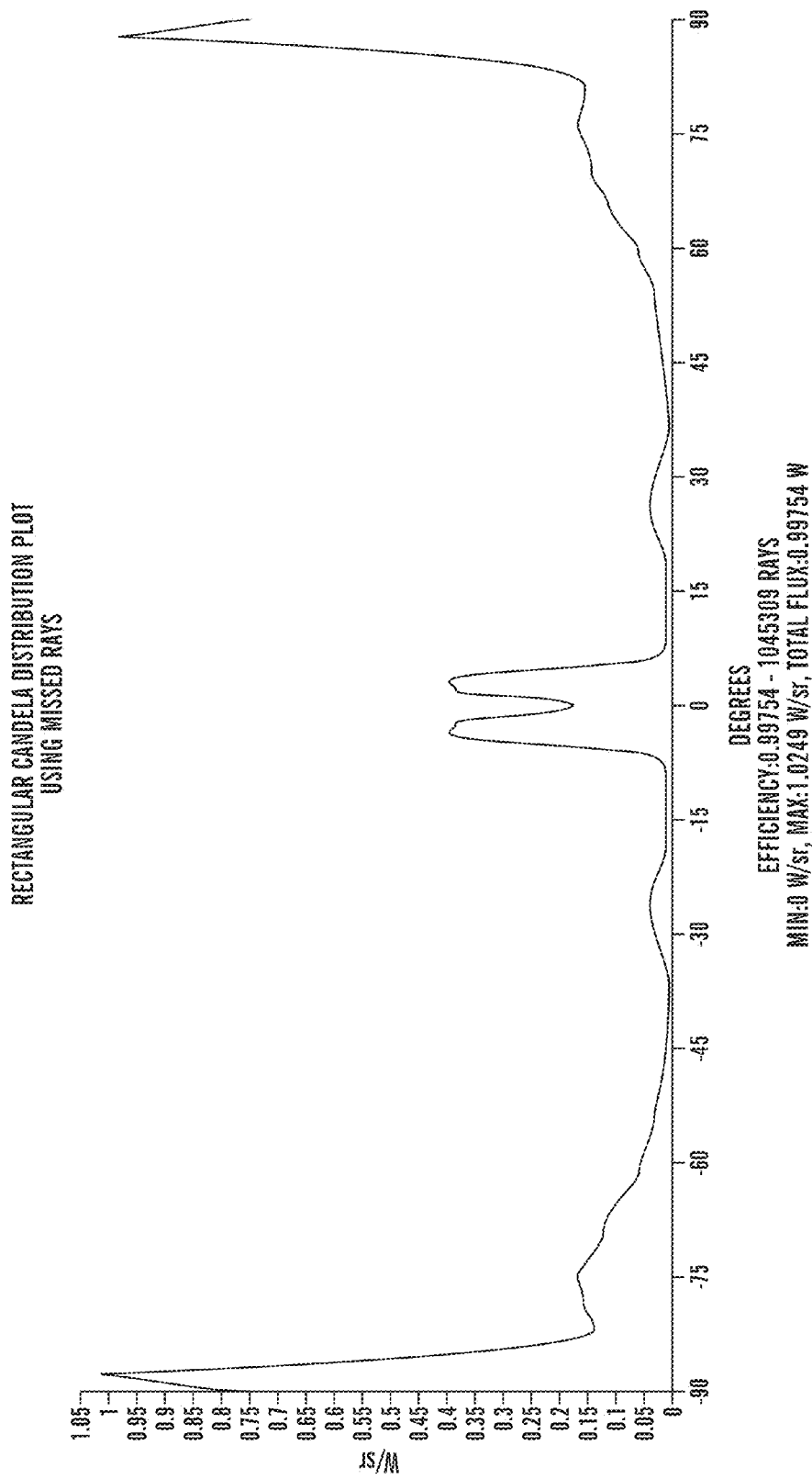
FIG. 12 is a ray trace output graph showing a rectangular candela distribution of output light in accordance with an exemplary embodiment of the present invention.

The effectiveness of the present invention is demonstrated by the output of a ray trace shown in FIG. 12. The vertical axis of the graph in FIG. 12 is the intensity, in Watts per steradian, output from the optical element 10 when a light source 14 is provided that has a Lambertian output emission profile. The vertical axis 3 corresponds to 0 degrees at the horizontal axis, and light that is radially emitted by the optical element 10 appears at the far sides of the graph at ±85° or more. The effectiveness of the present invention is apparent as can be seen by the large amount of light at these radial angles.

Figure 13:
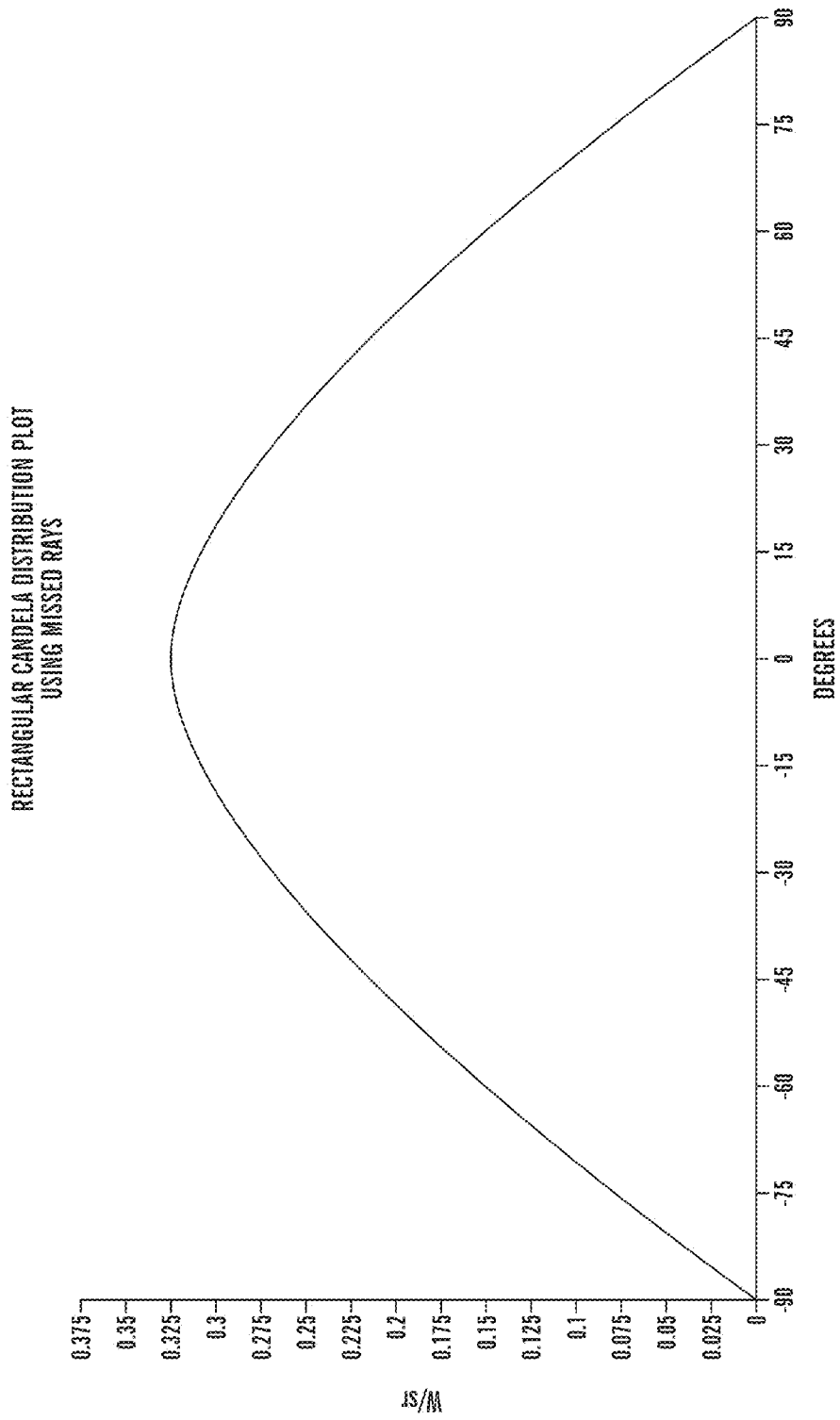
FIG. 13 is a comparative ray trace output graph showing a rectangular candela distribution of light which has not been subject to a side-emitting element in accordance with the present invention.

For comparison purposes, FIG. 13 is a similar raytrace output plot of the output light in which the optical element 10 was removed. Note that the curve in the plot traces out a Lambertian curve, with a peak value of 0.325 on axis, with essentially no light output at the far sides of the graph at ±85° or more. Clearly the present invention is effectively redirecting the Lambertian input profile into the heavily side-emitting profile per the graph of FIG. 12.

Figure 14:
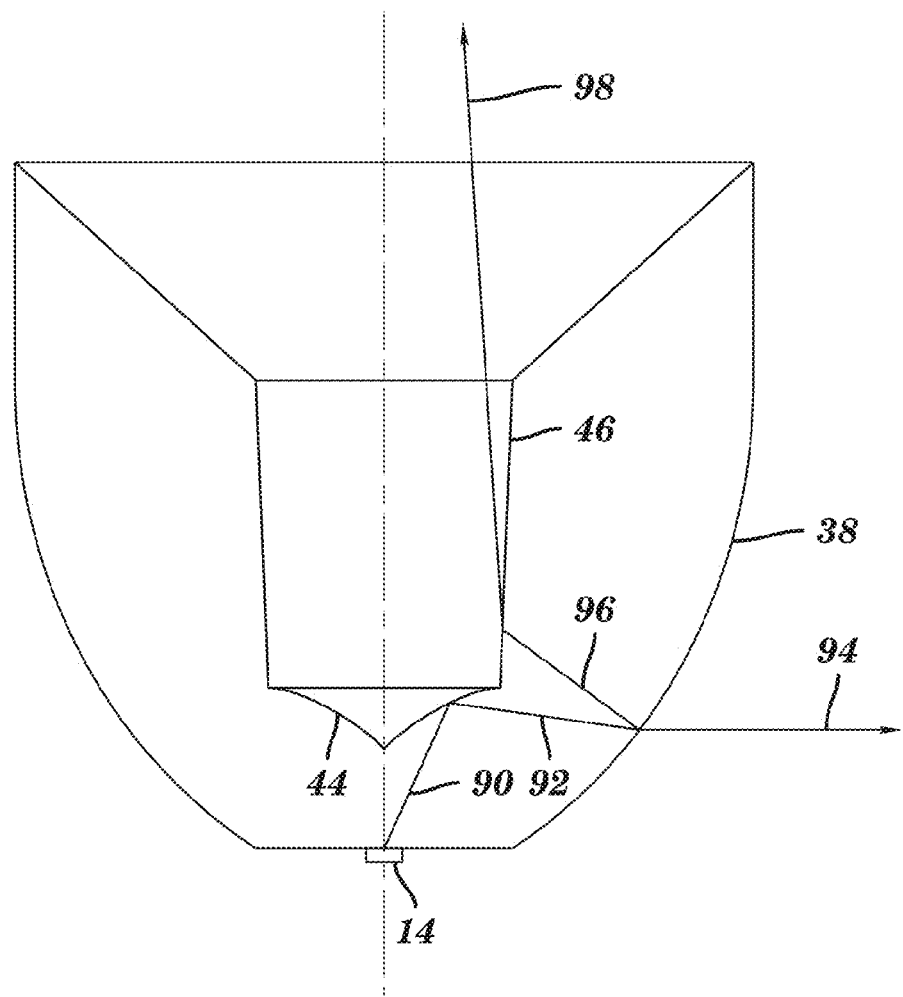
FIG. 14 is a cross-sectional view of a side-emitting optical element in accordance with exemplary embodiments of the present invention, in which stray light is illustrated.

One defect of the present invention is the appearance of a central lobe of output light that peaks at approximately ±5° as can be seen in the graph of FIG. 12. Referring to FIG. 14, this objectionable stray light results from fresnel reflection of light rays, such as ray-segment 92 that are incident on the outer TIRing surface 38 from the inner TIRing surface 44 as part of the normal operation of the optical element 20. When rays such as ray-segment 92 is incident on the outer TIRing surface 38, the majority of the light is transmitted through the outer TIRing surface, but a portion of it, represented by ray-segment 96, is specularly reflected according to the Fresnel equations.

The percentage of light flux contained in ray-segment 96 relative to incident ray-segment 92 depends upon the angle of incidence $\Theta_C$ and the refractive index of the material comprising the optical element 20, but is generally less than 10%. Ray-segment 96 is then incident on the recess sidewall 46, and refracts through it into ray-segment 98, which directly contributes to the objection lobe of stray light. This stray light, accumulated from the Fresnel reflections of many rays incident on the outer TIRing surface 38 produces the central lobe of light apparent in the central part of the graph of FIG. 12.

Figure 15:
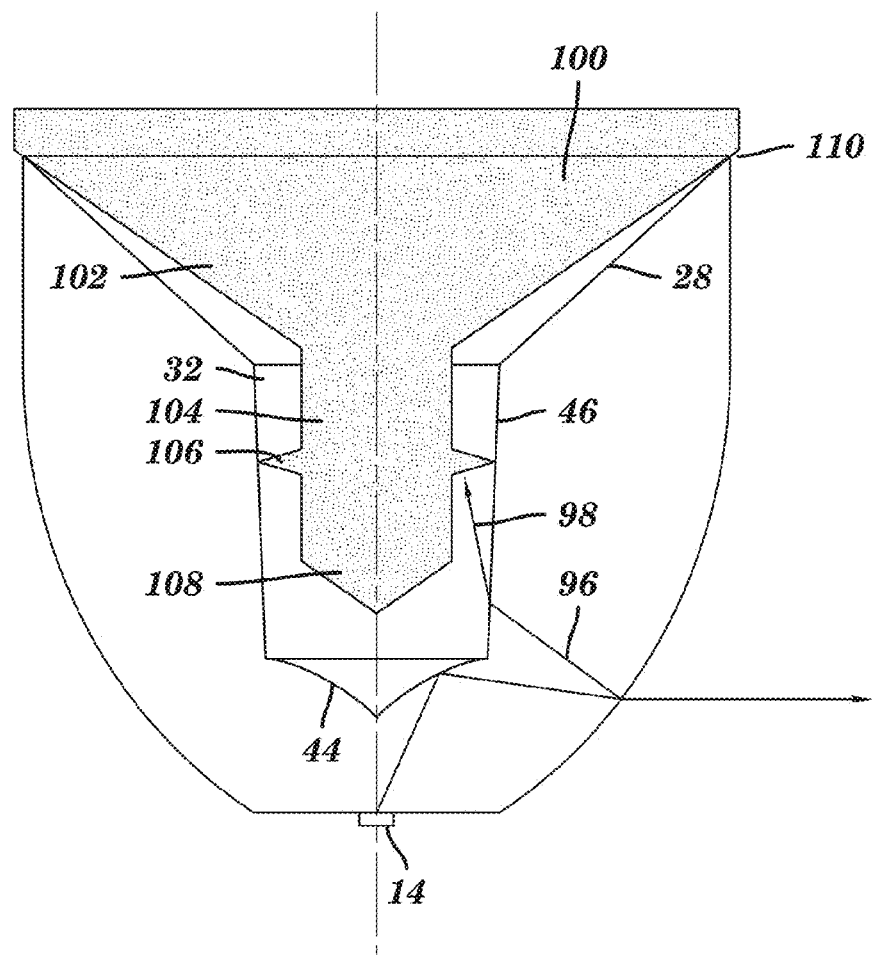
FIG. 15 is a cross-sectional view of a side-emitting optical element including a plug in accordance with exemplary embodiments of the present invention.

In a preferred embodiment, the stray light 98 of the optical element 10 can be removed by the addition of an opaque plug 100, as shown in FIG. 15. The opaque plug is preferably made from an elastomeric material, such as rubber, and can be reflective (white), partially reflective (gray), or even absorptive (black) depending upon the characteristics of the system in which it is installed. Alternately, the surface(s) of the plug 100 can be a specularly reflective, or partially specular and partially diffusely reflective, or entirely diffusely reflective.

The plug 100 is somewhat funnel-shaped, and consists of an upper conical section 102, an upper stem section 104, a seal 106, and a lower stem section 108. The upper conical section 102, the upper stem section 104, the seal 106, and the lower stem section 108 can be fabricated as one monolithic structure using molding processes well-known to those versed in these techniques.

The upper conical section 102 is designed to be placed into the conical recess 34 of the upper output section 24, but the conical surface 102 of the plug must not be in optical contact with the upper TIRing surface 28 in order to ensure that the TIRing characteristics of upper TIRing surface 28 are not compromised. The upper conical section 102 of the plug 100 is designed so that it is in mechanical contact with the output section 24 at just location 110.

The seal 106 is situated between the upper stem 104 and lower stem 108, and is a ring-shaped protuberance about the stem that serves two purposes. Firstly, the seal intercepts and blocks stray light rays 98, which in turn precludes the development of the objectionable lobe of central stray light seen in FIG. 12. Secondly, the outer diameter of the seal 106 is made to be slightly larger than the diameter of the inner recess 46, so that it acts as a friction fit against the sidewall of the inner recess 46 that holds the plug 100 in place in the optical element 10. The seal will clearly be in both mechanical and optical contact with the sidewall 46 of the recess 32. However, since the sidewall 46 is not an active optical surface for the optical element 10, its surface can be compromised with optical contact with no loss in the performance of the optical element 10.

The lower stem section 108 is optional, but can be provided as a gating location required during the molding operation. If it is provided, it must not extend deep into the recess 32 to the point where it is in optical contact with the inner TIRing surface 44, as that would compromise the TIRing capability of the inner TIRing surface 44 which is needed for proper operation of the optical element 20.

Figure 16:
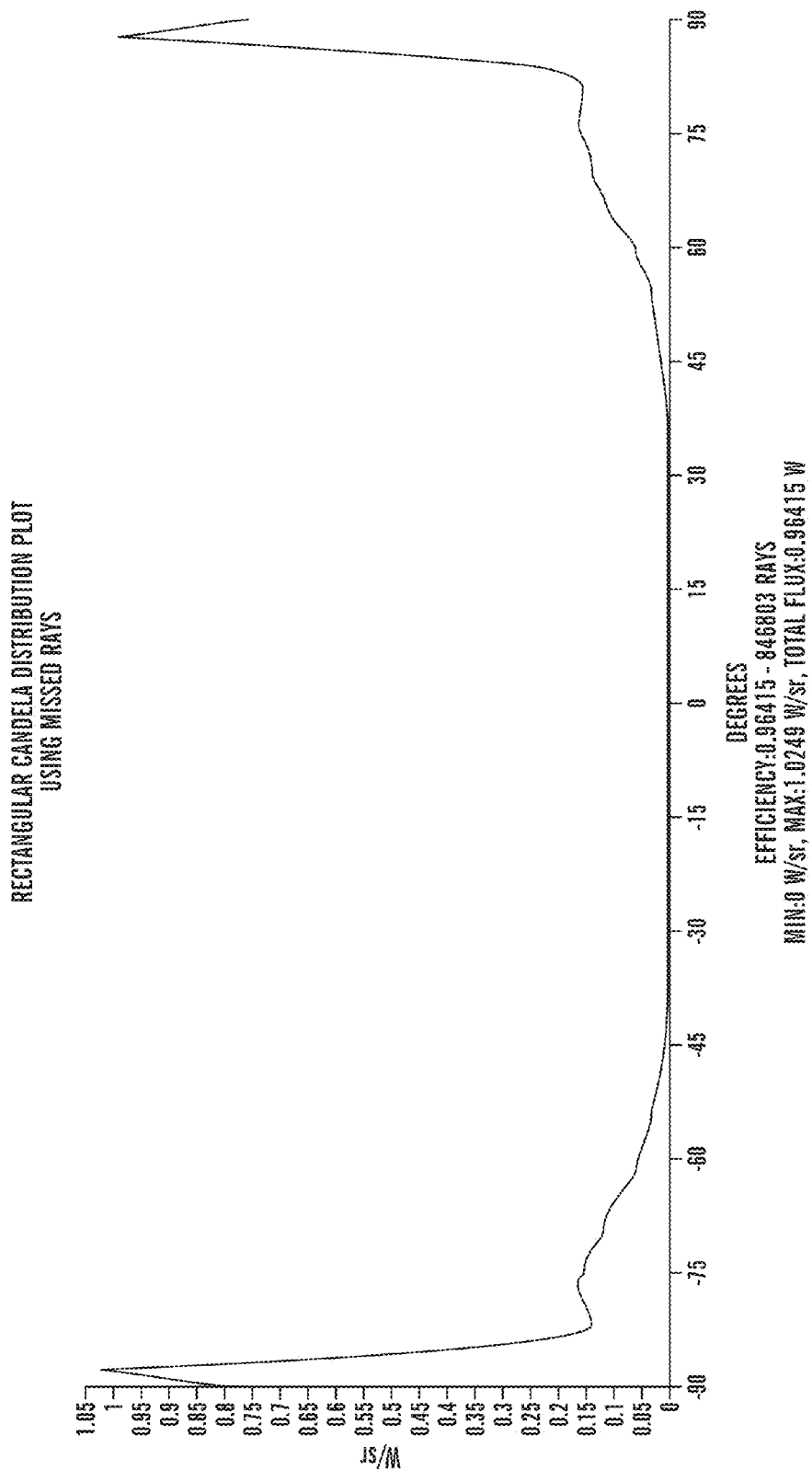
FIG. 16 is a ray trace output graph showing a rectangular candela distribution of condensed output light from a side-emitting optical element including a plug in accordance with an exemplary embodiments of the present invention.

As mentioned earlier, the effect of the plug 100 is to remove the central lobe of light that is output substantially on-axis as seen in FIG. 12. When the raytrace that generated the photometric plot of FIG. 12 is repeated with the plug 100 installed in the optical element 10, the photometric plot of FIG. 16 is generated. The addition of the plug 100 to the optical element 10 resulted in the removal of the objectionable central straylight, as it simply does not appear in the graph of FIG. 16. Furthermore, the radial side-to-side emissions at angles of ±85° and greater have not been reduced or otherwise compromised by the addition of the plug 100.

While it has been implicit in the description of the optical element 20 that it is desirable to limit the angular width of the radial emissions, there are some cases where a broader angular emission is desirable. In FIGS. 12 and 16 it is shown in the raytrace output that the radial emission is from about ±82° to about ±90°. In some cases, such as for emergency vehicle lights, a broader radial emission can be desirable. There are two ways that the upper output section 24 can be modified to attain a broader angular emission.

Figure 17:
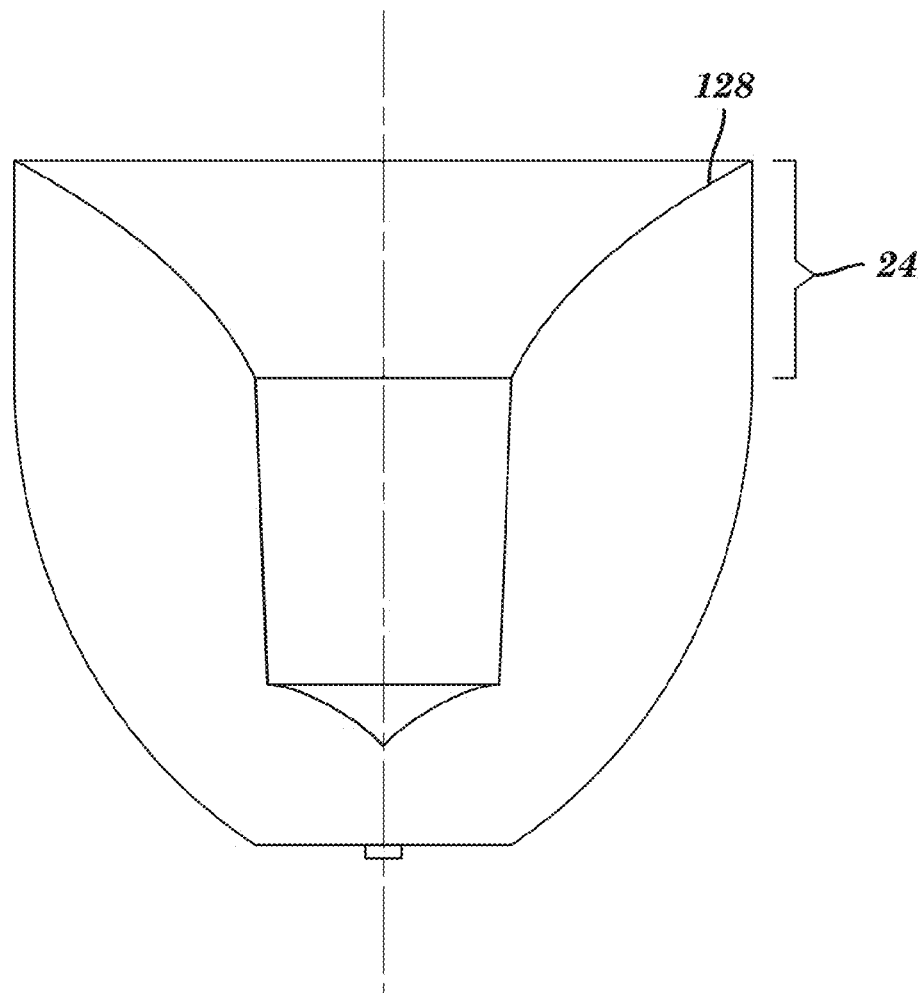
FIG. 17 is a cross-sectional view of a side-emitting optical element in accordance with the present invention in which the TIRing upper surface is curved in cross-section.
Figure 18:
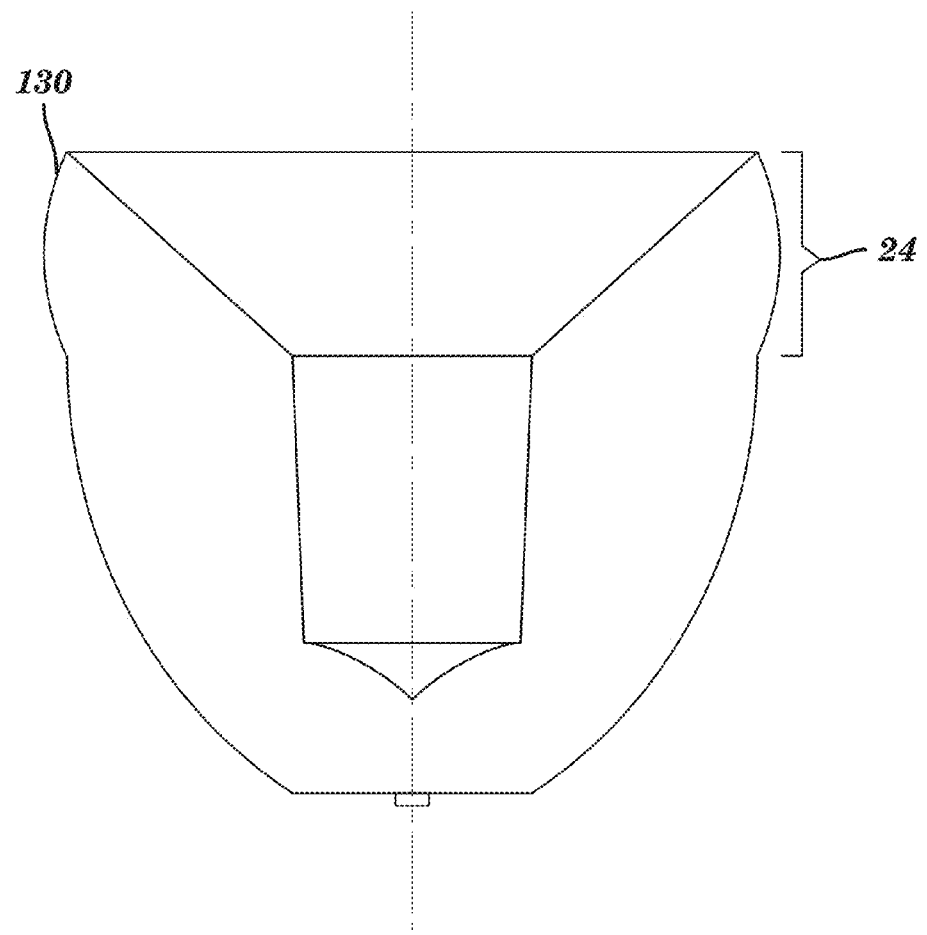
FIG. 18 is a cross-sectional view of a side-emitting optical element in accordance with the present invention in which the upper output surface is curved in cross-section.

One way to widen the angular output emission profile is to make the upper TIRing surface curved, as illustrated in FIG. 17. The upper TIRing surface 128 can be concave, convex, continuous, stepped, ruled, or even microstructured so that the light exiting from the surface exits over a range of angles. Alternately, as shown in FIG. 18, the output surface 130 can be curved, or have optical power in order to increase the angular width of the output emission.

Figure 19:
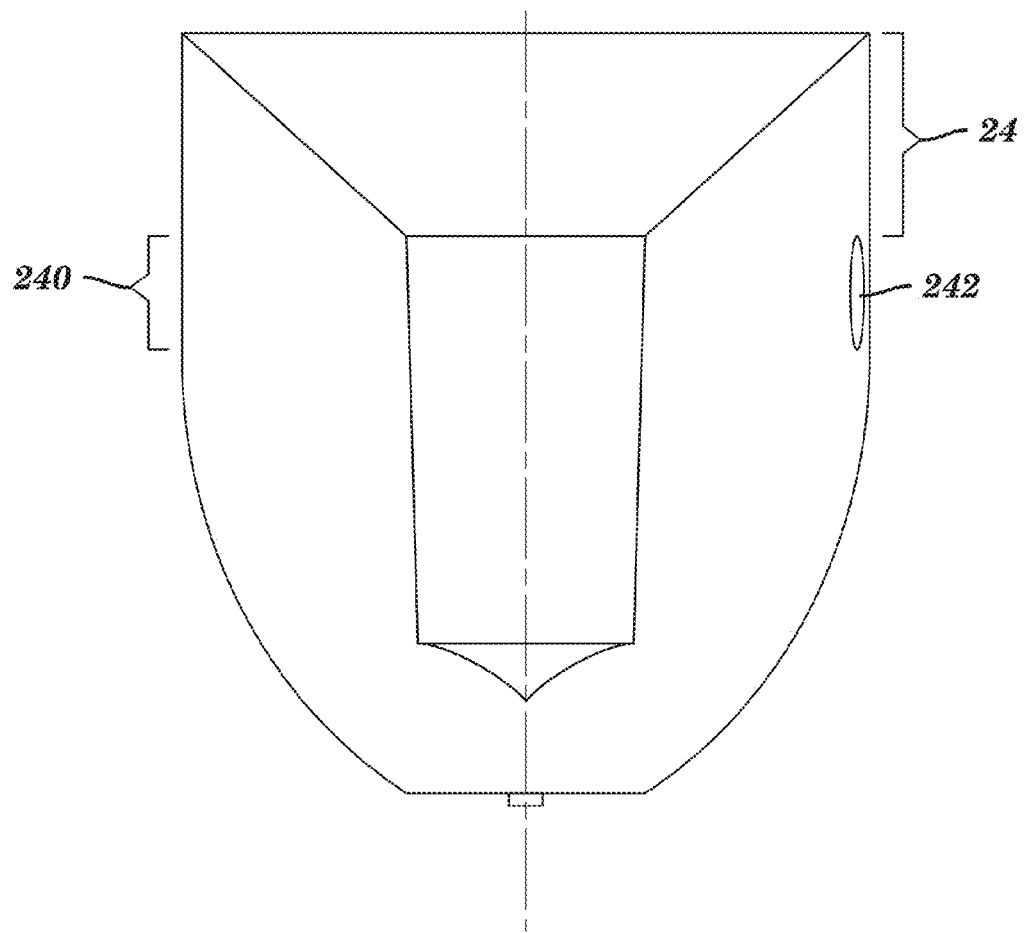
FIG. 19 is a cross-sectional view of a side-emitting optical element in accordance with the present invention in which an additional layer of material has been added to facilitate molding.

One challenging aspect of the optical element 10 is its moldability. Specifically, since all of the exterior surfaces need to be optical quality with good scratch and dig characteristics, a location for a gate needed for an injection molding fabrication process is not available. To remedy this, a region of additional material 240, as shown in FIG. 19, located just below the upper output section 24 can be provided. The surfaces of this region are optically unused, and can instead be used for the location of a gate 242 without adversely impacting the optical performance of the optical element.

Figure 20:
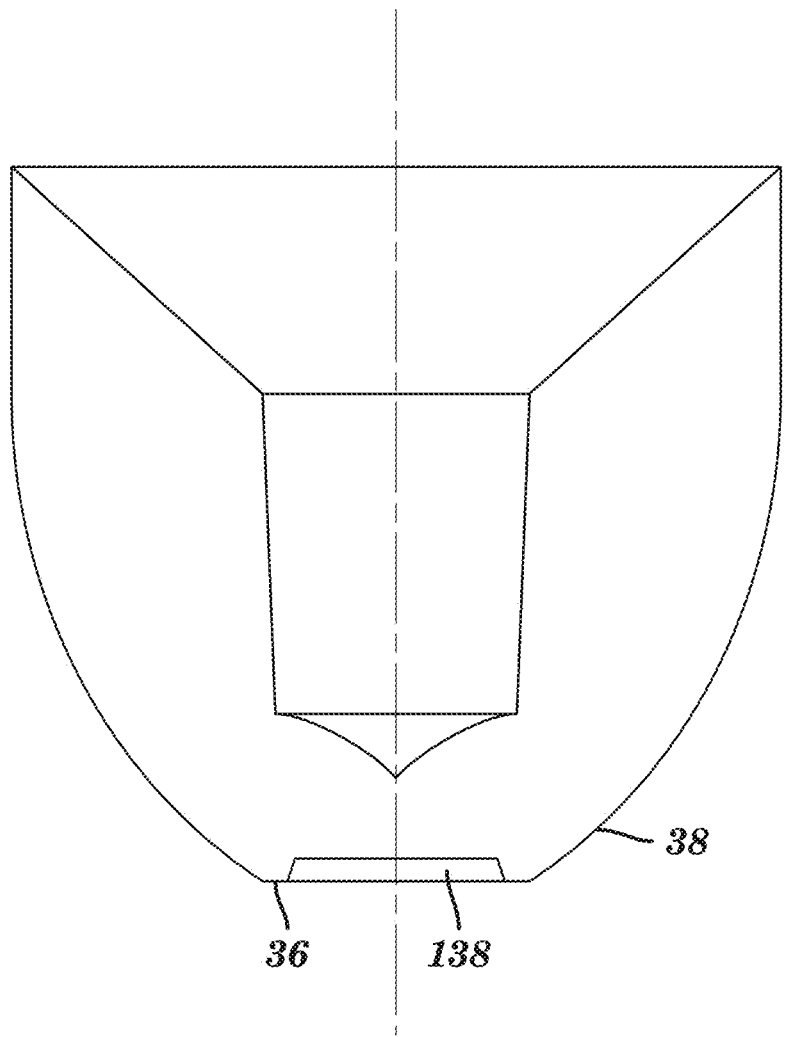
FIG. 20 is a cross-sectional view of a side-emitting optical element in accordance with the present invention in which a recess has been provided to facilitate attachment of the side-emitting optical element.

An additional challenging aspect of the optical element concerns the attachment of the source 14 or a film layer 16 to the input surface 36 of the optical element 10. Generally an adhesive will be used for the attachment, but if a film layer 16 is being bonded to the input surface 36 then the adhesive is prone to wicking or being pressed to an area at the edge of the outer TIRing surface 38, which will compromise the TIRing performance of the outer TIRing surface 38. To mitigate this, a special reservoir or recess 138 as shown in FIG. 20 can be provided within the input surface 36 in which an adhesive agent is placed. Additionally, by way of example FIG. 26 is the same as FIG. 20 except with multiple light sources with each light source 14 on a base section 16' in recess 138.

Figure 21:
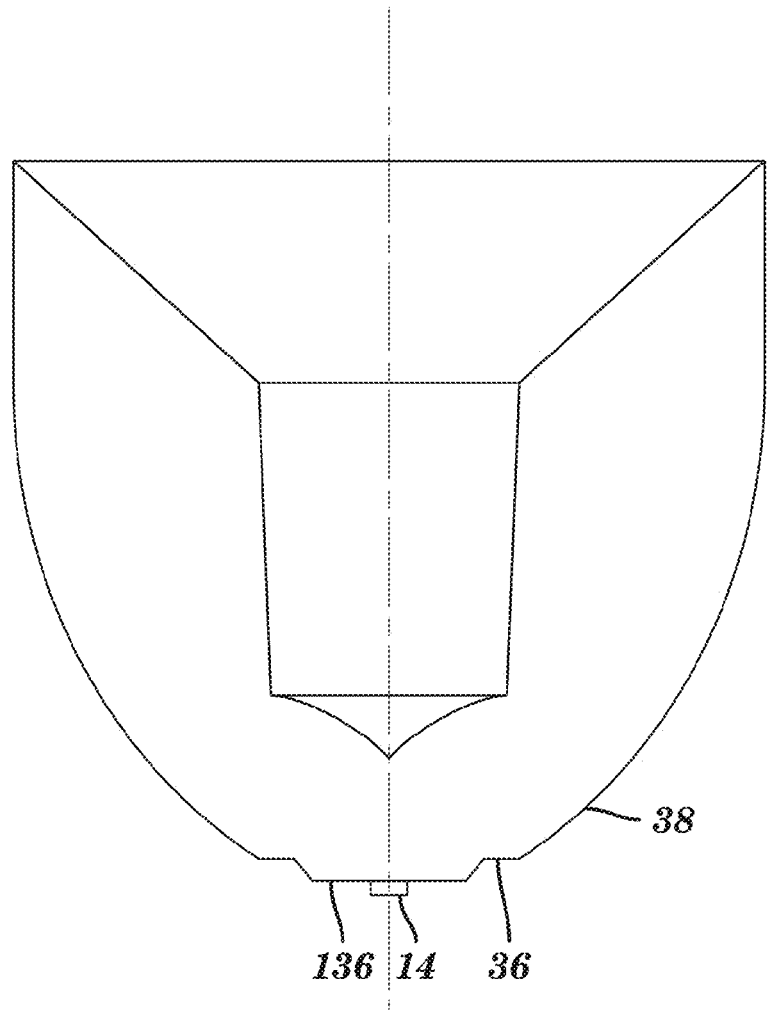
FIG. 21 is a cross-sectional view of a side-emitting optical element in accordance with the present invention in which a protuberance has been provided to facilitate attachment of the side-emitting optical element.
Figure 22:
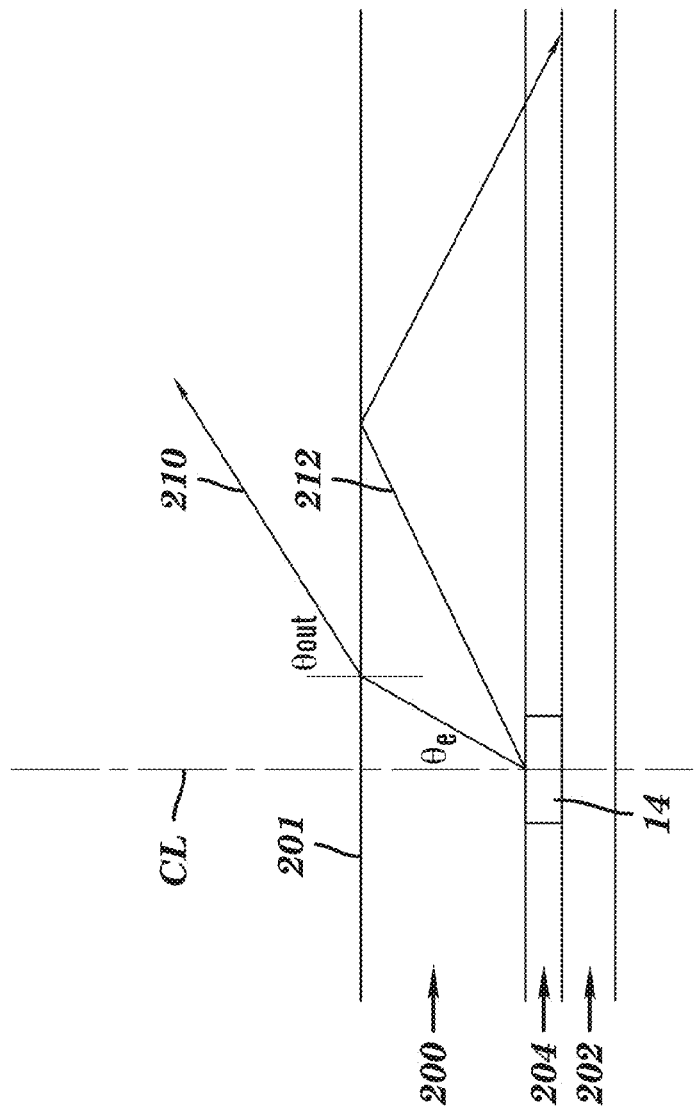
FIG. 22 is a cross-sectional view of a conventional LED die-based light source found in the prior art.

Alternately, if no film layer 16 is used and the source 14 is to be bonded directly onto the optical element, then a protuberance 136 can be provided within the input surface 36 as shown in FIG. 21. The adhesive can be located across the protuberance 136 haphazardly without the risk of it accidentally coming into contact with the outer TIRing surface 38 and compromising its performance An additional benefit of the present invention is to improve the efficiency of the light source. Referring to FIG. 22, a cross-sectional view of a conventional LED die-based light source is shown. The LED die 14 is encapsulated under a substantially transparent layer 200 of polymer material, such as PET, which seals the LED die 14 from environmental contaminants yet allows the light emitted from the LED die 14 to propagate through it. An opposing side of the LED die 14 is coupled to an electrical conductor 202, which supplies power to the LED die 14, and also conducts heat away from the LED die 14 generated during operation. The electrical conductor 202 is generally opaque and substantially non-reflective to light rays. An adhesive 204 is placed alongside the LED die 14 to bond the electrical conductor 202, LED die 14, and the transparent layer 200 together, which are all in optical contact with one another.

In operation, when power is supplied to the LED die 14 by the electrical conductor 202, light rays are emitted by the LED die 14 into the transparent layer 200. One of these rays is a non-obliquely emitted ray 210, which is emitted by the LED die 14 into the transparent layer 200, at angle θe with respect to the center-line CL. Ray 210 propagates through the transparent layer 200 and exits into the surrounding medium, such as air, at angle θout in accordance with Snell's Law.

Another ray is an obliquely emitted ray 212 which is emitted by the LED die 14 into the transparent layer 200 at an oblique angle. When the emitted ray 212 reaches surface 201 of the transparent layer 200, TIR occurs at the uppermost surface 201 of the transparent layer, and the ray 212 is reflected back on the substantially non-reflective conductor 202 where it is substantially absorbed. Accordingly, a portion of the rays that are emitted obliquely by the LED 14 are lost.

Figure 23:
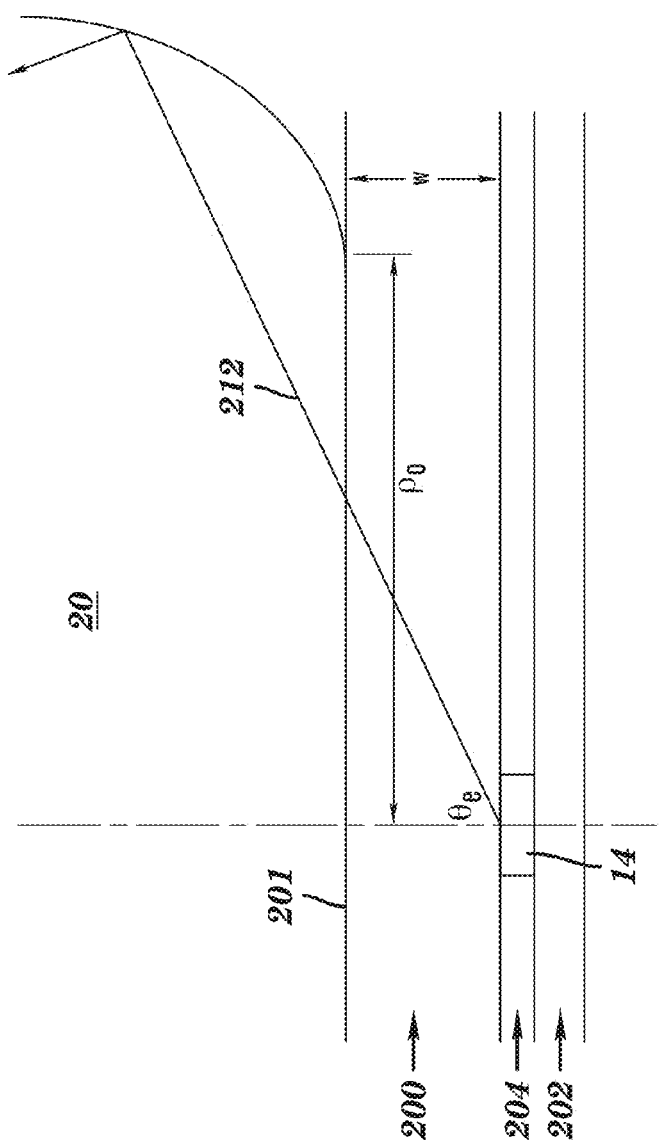
FIG. 23 is a partial cross-sectional view of a condensing element in accordance with an exemplary embodiment of the present invention.

Referring to FIG. 23, a partial, cross-sectional view of a TIRing condensing element in accordance with exemplary embodiments of the present invention coupled to an LED die-based light source along with an exemplary emitted light ray is illustrated. This figure illustrates how exemplary embodiments of the present invention can prevent oblique rays from being lost. In these embodiments, the LED die 14 also is encapsulated under a substantially transparent layer 200 of polymer material, such as PET, which seals the LED die 14 from environmental contaminants yet allows the light rays emitted from the LED die 14 to propagate through it, although other types and numbers of materials with other properties can be used. An opposing side of the LED die 14 is again coupled to an electrical conductor 202 which is used to supply power to the LED die 14 and also to conduct heat away from the LED die 14 generated during operation, although other manners for coupling power to the LED die 14 and for dissipating heat can be used. The electrical conductor 202 is generally opaque and substantially non-reflective to light, although other types of conductors with other properties can be used. An adhesive 204 is placed alongside the LED die 14 to bond the electrical conductor 202, LED die 14, and the transparent layer 200 together which are all in optical contact with one another, although other manners for optically coupling these elements together can be used. The TIRing condensing element 20, as previously illustrated and described herein, is installed on and is in optical contact with surface 201 of the transparent layer 200.

In operation, when the same ray 212 described earlier with reference to FIG. 22 is emitted by the LED die 14 into the transparent layer 200 at an oblique angle, there is no TIR of the ray 212 at the surface 201 of the transparent layer 200 below the condensing element 20. Instead, the ray 212 simply transmits through the surface 201 and into the TIRing condensing element 20. Once the ray 212 is in the TIRing condensing element 20, the ray 212 propagates in the manner previously illustrated and described herein. Accordingly, with the addition of the TIRing condensing element 20 on the surface 201 of the transparent layer 200, more of the light rays emitted by the LED die 14 are collected by the TIRing condensing element 20 improving the overall extraction efficiency of the optical system. In these embodiments, extraction efficiency equals the total light passing through a transparent layer divided by the total light entering the transparent layer.

When ray 212 is emitted at an extremely oblique angle, such that it reaches surface 201 at a location beyond the input surface 36 of the TIRing condensing element 20, it will not propagate into the TIRing condensing element 20 but instead TIR at the surface 201, and reflect back onto the substantially non-reflective conductor 202 and be substantially absorbed. In other words, while the TIRing condensing element 20 does act to improve the efficiency of the system, it does not achieve a collection efficiency of 100% because some rays, the highly oblique rays, are still being lost.

By way of example only, a numerical example to illustrate a typical efficiency improvement with the input surface 36 of the TIRing condensing element 20 on the surface 201 of the transparent layer 200 will now be described. If the refractive index of the transparent layer 200 is 1.556, then its critical angle is 40.0°. To facilitate the calculations, a table of emissions, in percent, as a function of θe, in degrees, is presented in FIG. 24. The emissions from the LED 14 are assumed to be Lambertian in nature, which follow a cosine-law drop-off with angle θe, and the amount of light emitted into angles above θe in accordance with the cosine-law is presented in the "Source Emission Beyond θe" column. The light collection is also a function of solid-angle, whose calculations are presented in the "Solid Angle . . . " and "Hemisphere . . . " columns. The rightmost column, "% of Light Emitted Beyond θe" is the multiplication of the cosine-law column and "% of Hemisphere Beyond θe" column, and is the column of interest in computing collection efficiencies of the TIRing condensing element 20.

Again, assuming in this particular example, the critical angle is 40.0° then from the rightmost column of the table in FIG. 24, 27.36% of the light emitted by the LED die 14 lies outside the 40° critical angle, and will be TIR'ed. Accordingly, at this critical angle, 72.64% of the light will not be TIR'ed.

Next, if the input surface 36 of the condensing element 20 is now in optical contact with the surface 201 of the transparent layer 200 and in this particular example the radius of the input surface 36, $\rho_o$, is 1.0 mm and the width w of the transparent layer 200 is 0.1 mm, the collection angle of the emitted light θe is then $\tan^{-1}(1/0.1)=84.3°$. From the rightmost column of the table in FIG. 24, at 84°, only 0.06% of the light emitted from the LED die 14 will miss the input surface 36 and TIR at the uppermost surface 201 of the transparent layer 200. In other words, 99.94% of the light emitted by the LED die 14 into transparent layer 200 will be collected by the TIRing condensing element 20, which is a substantial improvement in efficiency.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An optical element comprising:
    an outer section having a light input surface, a cylindrical light output surface, and a circumferential curved sidewall in a cross-sectional view, wherein the sidewall extends between the light input surface at one end and the light output surface at the other end and has a curvature which provides substantially total internal reflection of light emitted from the light input surface and directly incident upon the sidewall in a direction substantially parallel to the optical axis of the light emitted from the light input surface;
    a circumferential curved inner TIRing section in the cross-sectional view and recessed within the outer section such that the light emitted from the input surface and incident upon the curved inner section is not incident upon the output surface;
    a circumferential substantially non-curved upper section in the cross-sectional view and positioned at approximately a 45° angle relative to the optical axis of the light emitted from the input surface;
    a circumferential substantially non-curved sidewall in the cross-sectional view and extending from the inner section to the circumferential substantially non-curved upper section.

2. The element as set forth in claim 1, wherein the inner section has at least one sidewall which is substantially linear in cross-section.

3. The element as set forth in claim 2, wherein the at least one sidewall of the inner section tapers to an end point at the optical axis of the optical element.

4. The element as set forth in claim, 1 wherein the inner section has at least one sidewall that is at least one of non-linear in cross-section, textured, or made from a light diffusing material.

5. The element as set forth in claim 1, wherein the light output surface is substantially planar in cross-section.

6. The element as set forth in claim 1, further comprising at least one light source positioned at the light input surface to transmit light into the outer section of the optical element.

7. The element as set forth in claim 6, wherein the light source is at least one light emitting diode.

8. The element as set forth in claim 7, further comprising multiple light sources positioned adjacent the optical axis of the element to transmit light into the outer section of the optical element.

9. The element as set forth in claim 8, wherein the multiple light sources comprise a red light source, a green light source, and a blue light source.

10. The element as set forth in claim 1, wherein the outer section, inner section, and upper section of the optical element are integrally formed together.

11. The element of claim 1, wherein condensed light output from the outer section is white.

12. The element of claim 1 further comprising a plug disposed within the outer section, wherein the plug comprises:
    an upper plug section disposed within a recess defined by the circumferential substantially non-curved upper section and further wherein the upper plug section is optically isolated from the circumferential substantially non-curved upper section; and
    a stem section extending from the upper plug section and disposed in a recess defined by the substantially non-curved sidewall.

13. The element of claim 12 further comprising:
a seal comprising a ring-shaped protuberance extending from the stem and in contact with the circumferential substantially non-curved sidewall.

14. The element of claim 13 wherein an outer diameter of the seal is larger that the diameter of the circumferential curved inner TIRing section to provide a friction-fit between the seal and the circumferential curved inner TIRing section.

15. The element of claim 13 wherein the stem section extends below the seal into the circumferential curved inner TIRing section.

16. The element of claim 12 wherein the plug is formed as a monolithic structure.

17. The element of claim 12 wherein the plug is formed of a reflective material.

18. The element of claim 12 wherein the plug is formed of an absorptive material.

* * * * *